US011947934B2

(12) United States Patent
Rahill-Marier et al.

(10) Patent No.: US 11,947,934 B2
(45) Date of Patent: Apr. 2, 2024

(54) AUTO-GENERATING INTERACTIVE WORKFLOW USER INTERFACES FOR SIMULATED SYSTEMS

(71) Applicant: Palantir Technologies Inc., Denver, CO (US)

(72) Inventors: Bianca Rahill-Marier, New York, NY (US); Casey Patton, London (GB); Charles Perinet, London (GB); Julien Levy, London (GB); Robert Fink, Munich (DE)

(73) Assignee: Palantir Technologies Inc., Denver, CO (US)

( * ) Notice: Subject to any disclaimer, the term of this patent is extended or adjusted under 35 U.S.C. 154(b) by 159 days.

(21) Appl. No.: 17/583,058

(22) Filed: Jan. 24, 2022

(65) Prior Publication Data

US 2022/0236965 A1    Jul. 28, 2022

Related U.S. Application Data

(60) Provisional application No. 63/201,110, filed on Apr. 13, 2021, provisional application No. 63/141,408, filed on Jan. 25, 2021.

(51) Int. Cl.
*G06F 8/33*       (2018.01)
*G06F 8/36*       (2018.01)
*G06F 8/41*       (2018.01)

(52) U.S. Cl.
CPC .............. *G06F 8/33* (2013.01); *G06F 8/36* (2013.01); *G06F 8/433* (2013.01)

(58) Field of Classification Search
CPC ... G06F 8/33; G06F 8/36; G06F 8/433; G06F 8/38; G06F 9/451

(Continued)

(56) References Cited

U.S. PATENT DOCUMENTS 7,051,036 B2 * 5/2006 Rosnow ................. G06Q 10/06
                                                    707/723
7,685,140 B2 * 3/2010 Jackson .................. G06F 16/25
                                                    707/999.1

(Continued)

FOREIGN PATENT DOCUMENTS

EP        3107014      12/2016
EP        3866024       8/2021

(Continued)

OTHER PUBLICATIONS

Mandal, Nandita, et al. "Integrating existing scientific workflow systems: the Kepler/Pegasus example." Proceedings of the 2nd workshop on Workflows in support of large-scale science. 2007. pp. 21-28 (Year: 2007).*

(Continued)

*Primary Examiner* — Satish Rampuria
(74) *Attorney, Agent, or Firm* — Knobbe, Martens, Olson & Bear, LLP

(57) ABSTRACT

Systems, computer program products, and computer-implemented methods for generating interactive graphical user interfaces, software-based workflows, and data integrations using catalogs of workflow applications and auto-generation of aspects of the workflows. A method of the disclosure may include accessing one or more data stores that store: information indicative of one or more data sources, information indicative of one or more data object types, information indicative of one or more applications, and information indicative of compatibilities between the one or more data object types and the one or more applications; receiving a first user input indicating an association between a first data source and a first data object type; and based on the compatibilities and the indicated association, automatically populating each of the one or more applications that is compatible with the first data object type with data from the (Continued)

first data source, wherein populating includes generating interactive graphical user interfaces.

19 Claims, 29 Drawing Sheets

(58) Field of Classification Search
USPC .................................................. 717/113–178
See application file for complete search history.

(56) References Cited

U.S. PATENT DOCUMENTS

| | | | |
|---|---|---|---|
| 7,788,631 B2* | 8/2010 | Sieron .................... | G06Q 10/06 706/45 |
| 8,498,985 B2* | 7/2013 | Spence .................. | G06Q 10/06 707/711 |
| 9,032,312 B2* | 5/2015 | Barnes .................. | G06F 3/0484 715/764 |
| 9,275,482 B1* | 3/2016 | Dannelongue ........ | G06T 11/206 |
| 10,113,408 B2 | 10/2018 | Pobedinski et al. | |
| 11,567,639 B2 | 1/2023 | Rickard et al. | |
| 11,650,728 B2 | 5/2023 | Floren et al. | |
| 11,816,555 B2 | 11/2023 | Rickard et al. | |
| 2004/0107085 A1 | 6/2004 | Moosburger et al. | |
| 2005/0010901 A1 | 1/2005 | Udler | |
| 2010/0050152 A1* | 2/2010 | Gilboa .................. | G06F 40/166 717/106 |
| 2015/0348310 A1 | 12/2015 | Watanabe et al. | |
| 2016/0097270 A1 | 4/2016 | Pobedinski et al. | |
| 2016/0110369 A1 | 4/2016 | Cervelli et al. | |
| 2016/0180466 A1 | 6/2016 | Caldwell | |
| 2016/0210270 A1 | 7/2016 | Kelly et al. | |
| 2018/0024731 A1 | 1/2018 | Sanches et al. | |
| 2018/0181093 A1 | 6/2018 | Schulz et al. | |
| 2018/0322396 A1* | 11/2018 | Ahuja-Cogny ........ | G06N 5/022 |
| 2018/0337940 A1 | 11/2018 | Seiver | |
| 2020/0124753 A1 | 4/2020 | Halsey et al. | |
| 2020/0162340 A1 | 5/2020 | Rossi et al. | |
| 2020/0311199 A1 | 10/2020 | Yan et al. | |
| 2021/0119576 A1 | 4/2021 | Padullaparthi et al. | |
| 2021/0248447 A1 | 8/2021 | Rickard et al. | |
| 2021/0255748 A1 | 8/2021 | Rickard et al. | |
| 2022/0075515 A1 | 3/2022 | Floren et al. | |
| 2023/0125026 A1 | 4/2023 | Rickard et al. | |
| 2023/0259263 A1 | 8/2023 | Floren et al. | |

FOREIGN PATENT DOCUMENTS

| | | |
|---|---|---|
| EP | 3869414 | 8/2021 |
| WO | WO 2022/056529 | 3/2022 |
| WO | WO 2022/159890 | 7/2022 |

OTHER PUBLICATIONS

Marru, Suresh, et al. "Apache airavata: a framework for distributed applications and computational workflows." Proceedings of the 2011 ACM workshop on Gateway computing environments. 2011. pp. 21-28 (Year: 2011).*
Han, Weiguo, et al. "Building an on-line geospatial analysis system with ajax and web services." 2009 Congress on Services—I. IEEE, 2009.pp. 408-413 (Year: 2009).*
Casati, Fabio, et al. "Using patterns to design rules in workflows." IEEE Transactions on Software Engineering 26.8 (2000): pp. 760-785. (Year: 2000).*
Han, Youngmahn. "Bioworks: a workflow system for automation of bioinformatics analysis processes." 2011 International Conference on Ubiquitous Computing and Multimedia Applications. IEEE, 2011.pp. 76-81 (Year: 2011).*
Bock, Florian, et al. "Advantageous usage of textual domain-specific languages for scenario-driven development of automated driving functions." 2019 IEEE International Systems Conference (SysCon). IEEE, 2019.pp. 1-8 (Year: 2019).*
U.S. Appl. No. 17/171,927, Interactive Graphical User Interfaces for Simulated Systems, filed Feb. 9, 2021.
U.S. Appl. No. 17/171,898, System and Method for Chaining Discrete Models, filed Feb. 9, 2021.
U.S. Appl. No. 17/447,105, Interactive Graphical User Interfaces for Simulated Systems, filed Sep. 8, 2021.
Ahmed et al., "BranchConnect: Image Categorization with Learned Branch Connections", Mar. 12, 2018, IEEE Winter Conference on Applications of Computer Vision, pp. 1244-1253.
Ahmed et al., "MaskConnect: Connectivity Learning by Gradient Descent", Jul. 28, 2018, pp. 1-25.
Ba et al., "Blending Diverse Physical Priors with Neural Networks", Oct. 1, 2019, pp. 1-15.
Bellmann, "Interactive Simulations and advanced Visualization with Modelica," Proceedings of the 48th Scandinavian Conference on Simulation and Modeling (SIMS 2007), vol. 43, Oct. 8, 2009, pp. 541-550.
Cai et al., "Link Prediction Approach for Opportunistic Networks Based on Recurrent Neural Network", 2019 IEEE Access, vol. 7, pp. 2017-2025.
Cai et al., "ProxylessNAS: Direct Neural Architecture Search on Target Task and Hardware", Feb. 23, 2019, pp. 1-13.
Chen et al., "Exploiting Structural and Temporal Evolution in Dynamic Link Prediction", Oct. 2018, CIKM'18, pp. 427-436.
Das et al., "Chains of Reasoning over Entities, Relations, and Text using Recurrent Neural Networks", May 1, 2017, 10 pages.
Gregor et al., "Learning Fast Approximations of Sparse Coding", Proceedings of the 27th International Conference on Machine Learning, 2010, 8 pages.
Guo et al., "A recurrent neural network based health indicator for remaining useful life prediction of bearings", 2017 Neurocomputing 240, pp. 98-109.
Lei et al., "GCN-GAN: A Non-linear Temporal Link Prediction Model for Weighted Dynamics Networks", Jan. 26, 2019, 9 pages.
Liu et al., "DARTS: Differentiable Architecture Search", Apr. 23, 2019, pp. 1-13.
Reichstein et al., "Deep learning and process understanding for data-driven Earth system science", Feb. 14, 2019, Nature vol. 566, pp. 195-204.
SCIL Systems & Control Innovation Lab, "The DLR Visualization Library," retrieved from the Internet: https://web.archive.org/web/20200813110336/https://www.systemcontrolinnovationlab.de/the-dlr-visualization/library/, Aug. 13, 2020, 3 pages.
Wu et al., "FBNet: Hardware-Aware Efficient ConvNet Design via Differentiable Neural Architecture Search", Dec. 14, 2018, pp. 1-10.
Zaamout et al., "Improving Neural Networks Classification Through Chaining", Sep. 11, 2012, Artificial Neural Networks and Machine Learning ICANN, 8 pages.
Official Communication for European Patent Application No. 21156704.5 dated Jul. 9, 2021, 7 pages.
Official Communication for European Patent Application No. 21156705.2 dated Jul. 23, 2021, 11 pages.
International Search Report and Written Opinion for International Application No. PCT/US2021/071395 dated Dec. 14, 2021, 16 pages.
Kali et al., "Sliding Mode with Time Delay Control for MIMO Nonlinear Systems With Unknown Dynamics," 2015, 6 pages.
Wright et al., "Real-Time Black-Box Modelling with Recurrent Neural Networks", Proceedings of the 22nd International Conference on Digital Audio Effects (DAFx-19), Sep. 2019, 9 pages.
International Search Report and Written Opinion for International Application No. PCT/US2022/013705 dated Apr. 21, 2022, 14 pages.
Kuhn et al., "Introspective Black Box Failure Prediction for Autonomous Driving", 2020 IEEE Intelligent Vehicles Symposium (IV), pp. 7.
Rubiolo et al., "Knowledge Discovery Through Ontology Matching: An Approach Based on an Artificial Neural Network Model", Information Sciences, vol. 194, Jul. 1, 2012, pp. 107-119.
Official Communication for European Patent Application No. 21156704.5 dated Oct. 6, 2023, 4 pages.

* cited by examiner

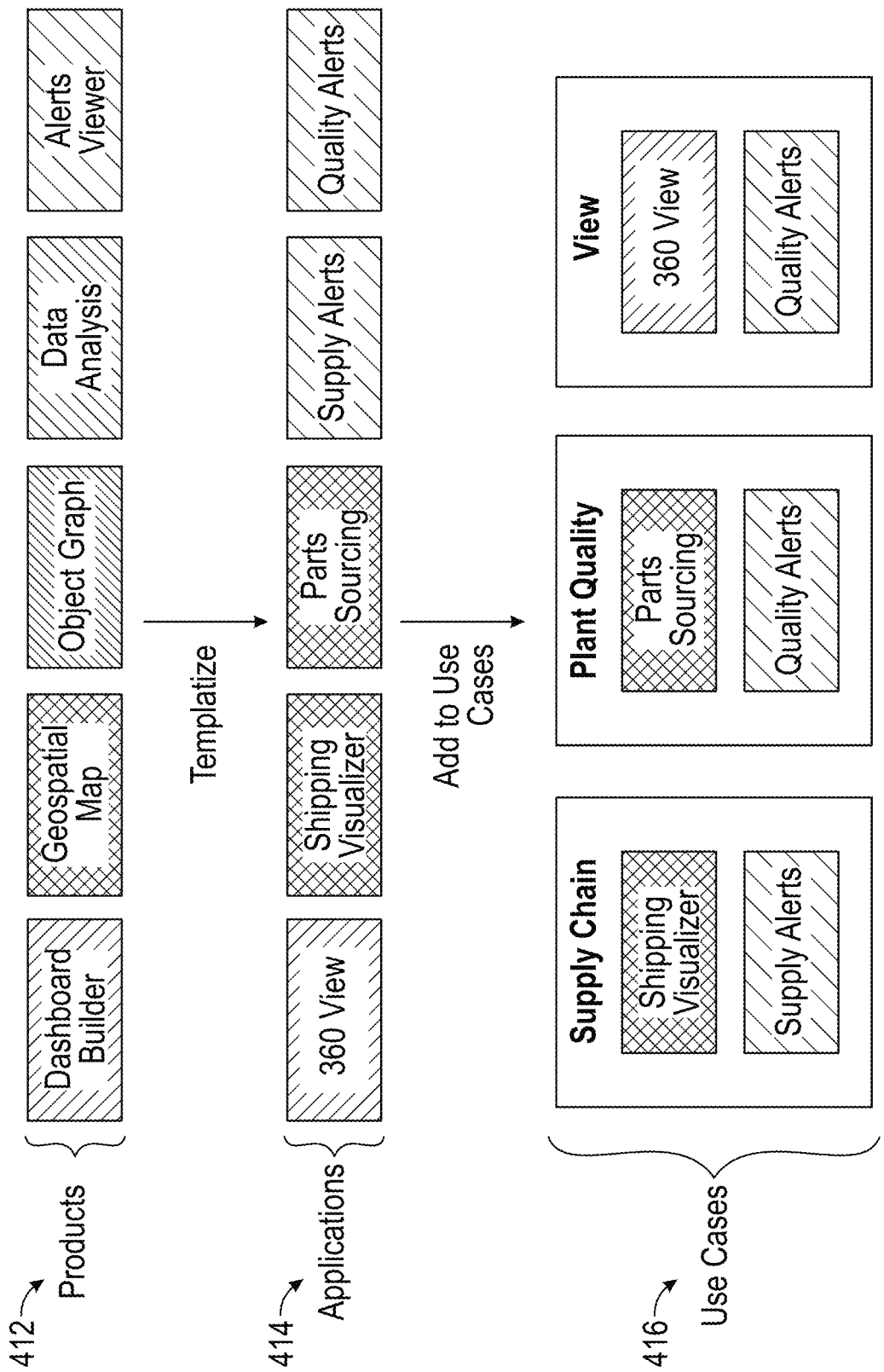

744

Object types 5/5    Functions    Actions 3/3    Apps

⊕ MATERIAL 5/5
[🔧 MSC Demo - Material] [×] [📄] OR [Generate object type] [>]
[INTRINSIC RELATIONS 4/4] [∧]

⊕ PLANT 2/2
A factory, workshop or plant where a product is manufactured or transformed
[🔧 MSC Demo - Plant] [×] [📄] OR [Generate object type] [>]
[INTRINSIC RELATIONS 1/1] [∧]

⊕ DISTRIBUTION CENTER 3/3
Facility from where a product is distributed
[🔧 MSC Demo - Distribution Center] [×] [📄] OR [Generate object type] [>]
[INTRINSIC RELATIONS 2/2] [∧]

⊕ CUSTOMER 3/3 [>]

742

← ⊕ Supply Chain

Display name
[Supply chain demo] [×]

Description
[Description]

746

[Delete use case]

FIG. 7E

← ⊕ Supply Chain     Object types 5/5    Functions   Actions 3/3   Apps

— 748

— 742 fx SEASONAL DEMAND FORECAST OPTIONAL

Required Signature
Type:     Function
cost:     Double
price:     Double
Output Type:    AnonymousCustomType

TS example:
```
Function ( )
Poblic forecastDemand(cost: Double, Price: Double): AnonymousCustomType
```

Select function fx ri.function-registry.main.function.bb6b6242-ee08-442e-8659-50c409f4e21e    Open Function ⧉

⊙ 0.0.9

— 750 fx PRODUCTION RECIPE OPTIONAL

Required Signature
Type:     Function
Output Type:    Double

TS example:
```
Function ( )
public get productionrecipe ( ) : Double
```

Select function fx Pick s function

Display name
| Supply chain demo | × |

Description
| Description |

[ Delete use case ]

FIG. 7F

Supply Chain

↤ ⊕ Supply Chain — 742

Object types 5/5    Functions    Actions 3/3    Apps — 752

Display name
Supply chain demo ✕ — 754

Description
Description

✏ CHANGE ORDER
An action to modify an order from a customer this should generally only be allowed until a certain time befour the order is fulfilled.

ACTION ARCHETYPE

Action
ƒx MASC- Partially fill order ⌄

Parameters
Sales Order Item — 756
123  Sales Order Item

Filled Allocation
Filled Allocation         OR

Distribution Center
Distribution Center

99  Edited By
Edited By

⊙  Edited Date
Edited Date

Rules
RUN FUNCTION
ƒx ri.function-registry.main.function-beb 5-4a 76-9b83-d6f47ff21450  ▷  ✕

Generate new action ⌄

[ Delete use case ] — 758

FIG. 7G

Welcome
Discover, manage and expand your use cases

902

DEPLOYED USE CASES (1)

Supply chain
Manage the entire value chain from suppliers, to transport of finished and semi-finished goods to sales and marketing DEPLOYED USE CASES
[→ Logistics] [⊬ Sales]

Readiness
Measure, track and improve the readiness of your organization in workforce or equipment DEPLOYED USE CASES
[⊟ Procurement] [⊟ Assessment]
[⊙ Qualification gap] +3 more

906

→ EXPAND          [🔍 Filter templates]

904

Supply Chain
An overview of your supply chain, production and customers.
Deploy ↗

COVID-19 Common Operating Picture
Understand and track the incidence of COVID-19 on your organization by overlaying open source data from multiple data sources.
Deploy ↗

Readines
Track the readiness of your workforce or equipments.
Deploy ↗

Resource Optimization
Optimize the resources used and stored across your organization.
Deploy ↗

FIG. 9A

```
object_types:
 -name: Employee
   identifier: employee
   properties:
     -name: Identifier
       identifier: id
       type: string
       constraints:
         -regexConstraint:
           value: \d\d\d-\d\d\d-\d\d
         -uniqueValuesConstraint
     -name: First name
       identifier: first_name
       type: string
       constraints:
         -minLengthConstraint:
           value: 1
     -name: Date of birth
       identifier: dob
       type: date_time
       optional: true
       constraints:
         -minConstraint:
           value: 01.01.1900
 -name: Company
   identifier: company
   properties:
     -name: Identifier
       identifier: id
       type: string
       constraints:
         -regexConstraint:
           value: \s\s\s-{/d+}
         -uniqueValuesConstraint
     -name: Region
       identifier: geo_region
       type: enum
       values: [EU, US, APAC]
       optional: true
object_links:
 -name: Employee works at company
   id: works_at
   left: employee.id
   right: company.id
```

1224 → tables:
       -name: Employee
        identifier: employee
        columns:
1226 →    -name: Identifier
           identifier: id
           type: string
           constraints:
             -regexConstraint:
                value: \d\d\d-\d\d\d-\d\d
             -uniqueValuesConstraint
          -name: First name
           identifier: first_name
           type: string
           constraints:
             -minLengthConstraint:
                value: 1
          -name: Date of birth
           identifier: dob
           type: date_time
           optional: true
           constraints:
             -minConstraint:
                value: 01.01.1900

FIG. 12B

AUTO-GENERATING INTERACTIVE WORKFLOW USER INTERFACES FOR SIMULATED SYSTEMS

CROSS-REFERENCE TO RELATED APPLICATIONS

This application claims benefit of U.S. Provisional Patent Application No. 63/141,408, filed Jan. 25, 2021, and titled "SOFTWARE PLATFORM FOR AUTO-GENERATING INTERACTIVE WORKFLOW USER INTERFACES," and U.S. Provisional Patent Application No. 63/201,110, filed Apr. 13, 2021, and titled "SOFTWARE PLATFORM FOR AUTO-GENERATING INTERACTIVE WORKFLOW USER INTERFACES." The entire disclosure of each of the above items is hereby made part of this specification as if set forth fully herein and incorporated by reference for all purposes, for all that it contains.

This application is related to U.S. patent application Ser. No. 17/447,105, filed Sep. 8, 2021, and titled "INTERACTIVE GRAPHICAL USER INTERFACES FOR SIMULATED SYSTEMS." The entire disclosure of the above item is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to automatic generation of interactive graphical user interfaces for software-based workflows and data integrations.

BACKGROUND

A database may store a large quantity of data. For example, a system may comprise a large number of sensors that each collect data at regular intervals, and the data may be stored in the database. The data can be supplemented with other data, such as simulated information based on the sensor data, and the supplemental data can also be stored in the database. In some cases, a user may attempt to analyze a portion of the stored data. For example, the user may attempt to analyze the simulated information. However, as the amount of data increases over time, it can become very difficult for the user to identify, visualize, and perform analysis on the relevant data.

SUMMARY

The systems, methods, and devices described herein each have several aspects, no single one of which is solely responsible for its desirable attributes. Without limiting the scope of this disclosure, several non-limiting features will now be described briefly.

Disclosed herein are various systems, computer program products, and computer-implemented methods for efficiently generating interactive graphical user interfaces, software-based workflows, and data integrations using, for example, catalogs of workflow applications and auto-generation of aspects of the workflows. The system can include a catalog of use cases and/or applications that allow the user to traverse the system platform (of numerous workflows, data sources, data analyses, software tools and functions, dashboards, interactive software and user interfaces, and/or the like), to rapidly achieve specific outcomes and deliver user-facing workflows. Using the system, deployment of a use case and/or application may be accomplished without writing any code. The catalog of use cases can be a catalog of templated implementations of products/applications. The templates can be end-to-end templates that start from the object layer and extend to end-user applications.

The system can apply an ontology to customer data, which can include various pre-defined data object types. Various types of logic can link those data objects and data object types into various applications. Those applications can comprise product templates, which can be based on various reusable products or reusable components of products of the system. The logic and/or product templates can include various data application programming interfaces ("APIs"), functions, models, user actions, interactive graphical user interfaces, and/or the like. Advantageously, the products and application templates can enable the system to automatically generate the information needed to generate a workflow and various interactive graphical user interfaces, when linked up with various data object types and data sources. The product templates (also referred to herein as "applications") can be grouped into use cases.

Advantageously, a user of the system may select a particular use case depending on their needs, and may then be presented with a list of suggested associated applications with may be useful for their needs. The user may then provide the data sources expected by the applications, and the system may then automatically provide all the useful functionality of the applications to the user with no further configuration needed. Thus, the system may efficiently provide significant functionality to a user without the user having to write code and/or configure each product available in the system. Additionally, multiple users may be able to take advantage of new or improved products, applications, and/or use cases as they are added to the system, without individual configuration and coding, providing greater efficiency and use of computing resources.

Applications provided by the system may include various functionality, including various modeling and simulation functionality, as described herein. The applications can include various interactive graphical user interface and associated functionality for, e.g., visualizing and interacting with various inputs and outputs, running simulations, optimizing simulations, and automatically determining and implementing recommendations. The optimization and simulation aspects may be based on multiple models that can collectively represent a real-world system, e.g., a real-world technical system. For example, live sensor data can be provided as an input to one or more of the simulated models which represent, for example, a technical system in the real world. In response, graphical user interfaces ("GUIs") may be generated that can include, for example, graph-based GUIs, map-based GUIs, and panel-based GUIs, among others. Additional examples and details regarding such applications are provided in U.S. patent application Ser. No. 17/447,105, which is incorporated by reference herein.

The system of the present disclosure can provide various technical solutions, features, use cases, and advantages. For example, organizations have proliferating data and modeling needs across functions in their internal operations as well as adjacent value chains. The system (and associated methods) of the present disclosure can generate GUIs and combine data, models, and workflows into a platform for running highly connected systems and organizations. The system offers various GUIs and/or frontends (e.g., graph, map, etc.) to visualize these systems across conventional data sources and functional silos, and a backend to weave the (e.g., quantitative, physics-based, machine-learning, etc.) models into the operational workflows to simulate cause and effect relationships.

The system of the present disclosure can include multiple technical aspects to provide various technical advantages, according to various implementations. Some of these technical aspects can include, for example, a data ontology; data models for simulations; and workflow modules including various "applications" as mentioned above.

A data ontology and data APIs can provide various advantages, for example: operational workflows in system can use data from objects as modeled by an ontology around which objects, links, and data properties are available; objects can comprise primary units of data, similar to a row in a database table but integrating data across many sources; objects can act as a digital twin to a real entity such as plants, widgets, patients; objects can be connected to each other by relations (for a basic relationship between two objects), links (links that contain data properties of their own), or transactions (specific events that happen between two objects at a point in time) which determine the connections that show up in the system; objects can have static (e.g., name and location) and time-dependent (e.g., current inventory levels) properties that can be measures or time series and can be charted over time. Additional explanations of ontology, objects, links, and the like are provided in present disclosure, according to various embodiments.

Workflow modules ("applications") can provide various advantages, for example: the system can provide benefits to operational users as the system can provide customized views for the users' specific contexts which may be accessible from objects in the system, where available. This can make it simpler to switch between a "zoomed out" view of the system, and a zoomed-in view for a specific functional workflow. Additional explanations of applications of the system are provided in present disclosure, according to various embodiments.

Advantageously, the system can, via, e.g., the applications/templates, the data object type definitions, the data APIs, and/or other aspects of the present disclosure (as described herein) provide technical automation for, e.g., determining compatibilities among technical data sources and applications/templates, connecting technical data sources to multiple applications/templates (e.g., associated with a use case or group of use cases), and efficiently generating technical interactive graphical user interfaces for each of the applications/templates, among other features and functionality.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs. In some embodiments, the data is updated and presented to the user in real-time.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays). The interactive user interfaces may allow a user to monitor and/or control various technical components and processes of technical real-world systems.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to rapidly review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate (e.g. forecast) future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems. The manner of presentation assists the user in controlling various technical components and processes by means of a continued and/or guided human-machine interaction process.

In some of the embodiments, the methods and systems described herein may receive input from one or more real-world systems and may also provide output to one or more real-world systems. In some of these embodiments, (measured) parameter values are obtained from measuring devices or sensors in a (technical) real-world system, the parameter values may be used, for example, to train one or more models (e.g., based on machine learning) or a basic model is already provided and the parameter values are used to adapt to the real-world system and/or to further refine the model. The model then allows to simulate the (technical) real-word system and the insights/predictions obtained via the simulation may again be used for monitoring and/or controlling the real-world system, e.g., using actuators, via the interactive and dynamic graphical user interfaces that are described herein. Such an approach may be employed, for example, to monitor and/or control a water treatment physical system or any other real-world system as will be explained in more detail below.

Various embodiments of the present disclosure provide improvements to various technologies and technological fields. For example, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 4A-4D show block diagrams illustrating example aspects of the system related to products, applications, use cases, and data integration, according to one or more embodiments;

FIGS. 5A-5B, 6A-6C, 7A-7H, 8, and 9A-9B illustrate example interactive graphical user interfaces, according to one or more embodiments;

FIGS. 12A-12B illustrate example data application programming interfaces ("APIs"), according to one or more embodiments.

DETAILED DESCRIPTION

Figure 1:
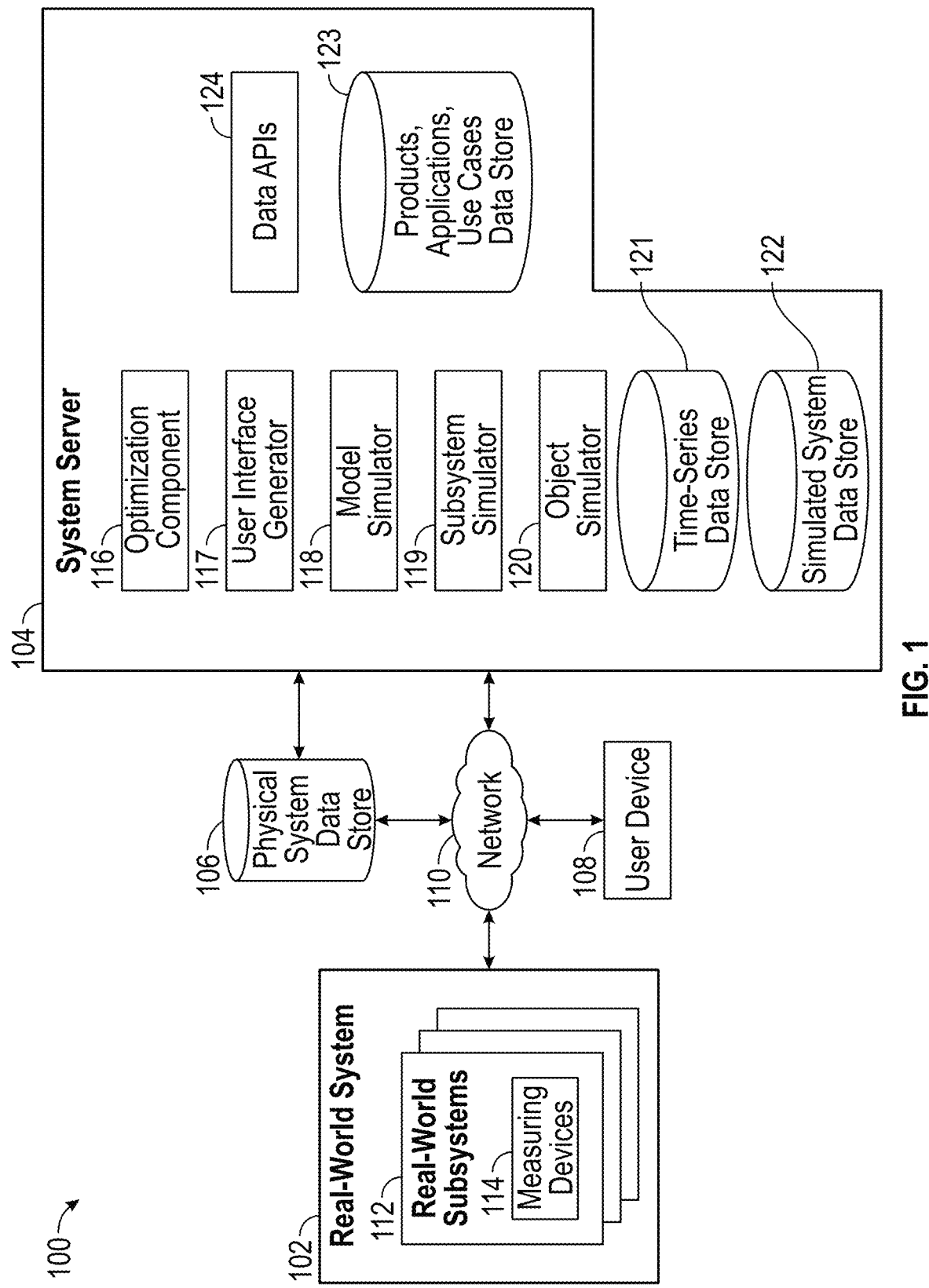
FIG. 1 shows a block diagram illustrating an example computing environment for automatically generating various interactive graphical user interfaces and related functionality and improvements, according to one or more embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

Disclosed herein are various systems, computer program products, and computer-implemented methods for efficiently generating interactive graphical user interfaces, software-based workflows, and data integrations using, for example, catalogs of workflow applications and auto-generation of aspects of the workflows. The system can include a catalog of use cases and/or applications that allow the user to traverse the system platform (of numerous workflows, data sources, data analyses, software tools and functions, dashboards, interactive software and user interfaces, and/or the like), to rapidly achieve specific outcomes and deliver user-facing workflows. Using the system, deployment of a use case and/or application may be accomplished without writing any code. The catalog of use cases can be a catalog of templated implementations of products/applications. The templates can be end-to-end templates that start from the object layer and extend to end-user applications.

The system can apply an ontology to customer data, which can include various pre-defined data object types. Various types of logic can link those data objects and data object types into various applications. Those applications can comprise product templates, which can be based on various reusable products or reusable components of products of the system. The logic and/or product templates can include various data application programming interfaces ("APIs"), functions, models, user actions, interactive graphical user interfaces, and/or the like. Advantageously, the products and application templates can enable the system to automatically generate the information needed to generate a workflow and various interactive graphical user interfaces, when linked up with various data object types and data sources. The product templates (also referred to herein as "applications") can be grouped into use cases.

Advantageously, a user of the system may select a particular use case depending on their needs, and may then be presented with a list of suggested associated applications with may be useful for their needs. The user may then provide the data sources expected by the applications, and the system may then automatically provide all the useful functionality of the applications to the user with no further configuration needed. Thus, the system may efficiently provide significant functionality to a user without the user having to write code and/or configure each product available in the system. Additionally, multiple users may be able to take advantage of new or improved products, applications, and/or use cases as they are added to the system, without individual configuration and coding, providing greater efficiency and use of computing resources.

Applications provided by the system may include various functionality, including various modeling and simulation functionality, as described herein. The applications can include various interactive graphical user interface and associated functionality for, e.g., visualizing and interacting with various inputs and outputs, running simulations, optimizing simulations, and automatically determining and implementing recommendations. The optimization and simulation aspects may be based on multiple models that can collectively represent a real-world system, e.g., a real-world technical system. For example, live sensor data can be provided as an input to one or more of the simulated models which represent, for example, a technical system in the real world. In response, graphical user interfaces ("GUIs") may be generated that can include, for example, graph-based GUIs, map-based GUIs, and panel-based GUIs, among others. Additional examples and details regarding such applications are provided in U.S. patent application Ser. No. 17/447,105, which is incorporated by reference herein.

Advantageously, the system can, via, e.g., the applications/templates, the data object type definitions, the data APIs, and/or other aspects of the present disclosure (as described herein) provide technical automation for, e.g., determining compatibilities among technical data sources and applications/templates, connecting technical data sources to multiple applications/templates (e.g., associated with a use case or group of use cases), and efficiently generating technical interactive graphical user interfaces for each of the applications/templates, among other features and functionality.

The system of the present disclosure can provide various technical solutions, features, use cases, and advantages. For example, organizations have proliferating data and modeling needs across functions in their internal operations as well as adjacent value chains. The system (and associated methods) of the present disclosure can generate GUIs and combine data, models, and workflows into a platform for running highly connected systems and organizations. The system offers various GUIs and/or frontends (e.g., graph, map, etc.) to visualize these systems across conventional data sources and functional silos, and a backend to weave the (e.g., quantitative, physics-based, machine-learning, etc.) models into the operational workflows to simulate cause and effect relationships.

The system of the present disclosure can include multiple technical aspects to provide various technical advantages, according to various implementations. Some of these technical aspects can include, for example, a data ontology; data models for simulations; and workflow modules including various "applications" as mentioned above.

A data ontology and data APIs can provide various advantages, for example: operational workflows in system can use data from objects as modeled by an ontology around which objects, links, and data properties are available; objects can comprise primary units of data, similar to a row in a database table but integrating data across many sources; objects can act as a digital twin to a real entity such as plants, widgets, patients; objects can be connected to each other by relations (for a basic relationship between two objects), links (links that contain data properties of their own), or transactions (specific events that happen between two objects at a point in time) which determine the connections that show up in the system; objects can have static (e.g., name and location) and time-dependent (e.g., current inventory levels) properties that can be measures or time series and can be charted over time. Additional explanations of ontology, objects, links, and the like are provided in present disclosure, according to various embodiments.

Workflow modules ("applications") can provide various advantages, for example: the system can provide benefits to operational users as the system can provide customized views for the users' specific contexts which may be accessible from objects in the system, where available. This can make it simpler to switch between a "zoomed out" view of the system, and a zoomed-in view for a specific functional workflow. Additional explanations of applications of the system are provided in present disclosure, according to various embodiments.

II. Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, comma separated values (CSV) files, eXtensible markup language (XML) files, TeXT (TXT) files, flat files, spreadsheet files, tables, data objects, and/or any other widely used or proprietary format for data storage. Databases are typically stored in one or more data stores. Accordingly, each database referred to herein (e.g., in the description herein and/or the figures of the present application) is to be understood as being stored in one or more data stores. Similarly, each data store referred to herein (e.g., in the description herein and/or the figures of the present application) can be understood as implementing, according to various embodiments, one or more databases for storage and retrieval of data.

Data Object or Object: A data container, structure, or file for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties. Data objects may also be referred to herein as data items.

Data Object Type or Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

Property: Attribute of a data object that represents information associated with the data object. A property of a data object may have a property type and a value or values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Measuring Device or Sensor: A device, system, or collection of devices or systems that can provide information, e.g., associated with an entity (e.g., device, system, gauge, instrument, detector, antenna, monitor, or any kind of scope, meter, or graph). For example, a sensor may provide reporting values (e.g., measurements or other information) associated with a manufacturing instrument. The received values may comprise values related to physical attributes or measurements (e.g., temperature, pressure, size, etc.), values related to virtual activity or measurements (e.g., network traffic, IP addresses, etc.), and/or the like. The information provided by sensors may be utilized and analyzed for various purposes.

Ontology: Stored information that provides a data model for storage of data in one or more databases/data stores. For example, the stored data may comprise definitions for data object types and respective associated property types. An ontology may also include respective link types/definitions associated with data object types, which may include indications of how data object types may be related to one another. An ontology may also include respective actions associated with data object types. The actions associated with data object types may include defined changes to values of properties based on various inputs. An ontology may also include respective functions, or indications of associated functions, associated with data object types, which functions may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

III. Example System Server and Related Computing Environment

FIG. 1 shows a block diagram illustrating an example computing environment 100 for automatically generating various interactive graphical user interfaces and related functionality and improvements, according to one or more embodiments.

As illustrated in FIG. 1, the example computing environment 100 may include a real-world and/or physical system 102, a system server 104, a real-world/physical system data store 106, and a user computing device 108. In an embodiment, the real-world system 102, the system server 104, the physical system data store 106, and the user device 108 communicate via a network 110. In other embodiments, there may be multiple real-world systems 102. These multiple real-world systems 102 may be of the same and/or different types. Further the multiple real-world systems 102 may also communicate via the network 110. Similarly, the functionality disclosed with reference to these components may be distributed to other computing devices and/or partially performed by multiple computing devices. In various implementations, the components of the example computing environment 100 may be in communication with each other via the network 110, one or more other computer networks, and/or via one or more direct connections.

The real-world system 102 may be a logical system, such as a representation of a supply chain. The real-world system 102 can also be a physical system that has a structure that comprises various components and equipment and may be located in various areas. For example, the real-world system 102 may be located at an environmental monitoring and/or research site such as a volcano, an ocean, a river, a lake, an ice sheet, a forest, and/or the like. In another example, the real-world system 102 may be a technical system, e.g., a manufacturing site, such as a location in which machinery is used to make articles. In another example, the real-world system 102 may be a vehicle such as a car, a bus, an airplane, a train, a boat, a bicycle and/or the like. In another example, the real-world system 102 may be a mine, a fracking site, an oil well, an oil, water, or gas pipeline, and/or the like.

The real-world system 102 may further include a plurality of real-world subsystems 112. The real-world subsystems 112 may make up the real-world system 102. For example, the real-world subsystems 112 may be a logical subsystem (e.g., a supply chain subsystem, such as a group of activities performed at a particular location like a distribution center). As another example, the real-world subsystems 112 may be a physical or technical subsystem, such as a gas pumping subsystem, a gas separation subsystem, and a gas compression subsystem that make up a gas pipeline physical system. As another example, the real-world subsystems 112 may be a movement detection subsystem, a gas detection subsystem, and/or other related subsystems that form a volcano monitoring physical system.

A plurality of logical computations (e.g., order volume, sales quantity during a time period, etc.), sensors, and/or measuring devices 114 may couple to the real-world subsystems 112. For example, the real-world subsystem 112 may include one or more logical computations if the real-world subsystem 112 is a logical subsystem. The measuring devices 114 may detect or measure statistics or other numerical values associated with the object (e.g., an item, a product, etc.) passing through the logical subsystem. As another example, the real-world subsystem 112 may include one or more sensors and/or measuring devices if the real-world subsystem 112 is a physical or logical subsystem. As an illustrative example, a gas compression subsystem may include a sensor and/or measuring device coupled to a gas compressor and a sensor and/or measuring device coupled to a gas compressor valve. As another illustrative example, a movement detection system may include a seismograph, a motion detector, a camera, and/or the like. The sensors and/or measuring devices 114 may detect or measure physical properties, such as pressure, flow rate, acoustic signals, temperature or changes in temperature, vehicle speed, motion, images, and/or the like.

In some embodiments, the real-world subsystems 112 may not exist and only a real-world system 102 includes the plurality of logical computations, sensors, and/or measuring devices 114. For example, a supply chain system may include one or more logical computations associated with the supply chain itself. As another example, a gas pipeline physical system may include a sensor and/or measuring device coupled to the gas pipeline. Another example may include a manufacturing site physical system that may include sensors and/or measuring devices coupled to a machinery physical subsystem so that monitoring of the operation of machinery at the manufacturing site and variations in manufacturing conditions, such as temperature, efficiency, output, etc., and/or the like may occur. Another example may include an airplane physical system that may include sensors and/or measuring devices coupled to one or more airplane physical subsystems, such as the engine, the transmission, the flaps, the propeller, the wheels, the landing gear, the exhaust, the rudder, etc., to track operation of the airplane physical subsystems, monitor weather conditions, identify deviations from an expected travel route, track fuel efficiency, and/or the like. The examples described herein are not meant to be limiting.

The real-world system 102 may further include logical computations, sensors, and/or measuring devices 114 coupled to real-world subsystems 112 that directly transmit the measurement data over the network 110 to the system server 104. In another embodiment, the real-world system 102 may include logical computations, sensors, and/or measuring devices 114 coupled to real-world subsystems 112 that transmit the measurement data over the network 110 to the physical system data store 106. In another embodiment, the real-world system 102 may include logical computations, sensors, and/or measuring devices 114 coupled to real-world subsystems 112 that transmit the measurement data over the network 110 to the user device 108.

The system server 104 may include various data stores and executable code modules. In an embodiment, the system server 104 may include an optimization component 116, a user interface generator 117, a model simulator 118, a subsystem simulator 119, an object simulator 120, one or more data application programming interfaces ("APIs") 124, a time-series data store 121, a simulated system data store 122, and a data store 123 that stores products, applications, use cases, and/or the like. In an embodiment, the optimization component 116, the user interface generator 117, the model simulator 118, the subsystem simulator 119, the object simulator 120, and the data APIs 124 are each implemented as executable code modules that are stored in the memory of, and executed by one or more processors of, the system server 104. The optimization component 116, the user interface generator 117, model simulator 118, the subsystem simulator 119, the object simulator 120, and the data APIs 124 may also be implemented partly or wholly in application-specific hardware.

In some embodiments, the executable code modules of the system server 104 may call various APIs to perform various functions. The executable code modules may receive data via the network 110 and/or from the physical system data store 106, time-series data store 121, simulated system data store 122, and/or data store 123. One or more of the data stores may comprise databases. Each of the real-world system data store 106, time-series data store 121, simulated system data store 122, and/or data store 123 may store data items/objects of various types, as described herein.

The physical system data store 106 may store and provide to the network 110, and/or to the system server 104, various data items/objects that may be related to logical computations, measuring devices, physical subsystems, technical subsystems, logical subsystems, physical systems, technical systems, and logical systems. For example, such data items may include a statistic related to a product or item that is the subject of a supply chain, a measurement of a measuring device, a category of a physical or logical subsystem, a health of a physical or logical system, and/or other like data items. In some implementations, the physical system data store 106 may additionally or alternatively include data or information derivable from or based on physical objects or events, or data or information related to non-real-world/non-physical objects or events. Further, in various implementations the physical system data store 106 may be included in the system server 104, and/or other aspects and components of the system server 104 and/or the computing environment 100 may be arranged differently from shown in the example of FIG. 1.

The time-series data store 121 may store and provide to the network 110, physical system data store 106 and/or to the other various data stores and/or executable code modules within the system server 104, various data items related to objects, subsystems, and/or measured or generated over a period of a time and/or at a specific point in time. For example, such data items may include a shelf life of an object, a schedule of a subsystem, historical information of a model, and/or other like data items.

The simulated system data store 122 may store and provide to the network 110, physical system data store 106, and/or to the other various data stores and/or executable code modules within the system server 104, various data items related to objects, subsystems, and/or models generated as a result of a simulation of the objects, subsystems, and/or models. For example, such data items may include a virtual copy of a physical object and related properties, a virtual subsystem simulated from a physical or logical subsystem, a model characterized by a physical or logical system, and/or other like data items.

The data store 123 may store and provide to the network 110, physical system data store 106 and/or to the other various data stores and/or executable code modules within the system server 104, various information related to products, applications, and use cases. As described herein, the products, applications, and/or use cases may be implemented, populated, and configured by the system and/or users of the system to automatically generate various interactive graphical user interfaces. Population of the products, applications, and/or use cases may be with various data items/objects as described herein. For example, one or more data sources (including, for example, one or more data connectors or data pipelines) may be associated with or linked to an application, which may provide various data items to the application such that the application may provide various interactive graphical user interfaces based on the various data items.

While the time-series data store 121, simulated system data store 122, and data store 123 are illustrated as being stored in the system server 104, this is not meant to be limiting. The time-series data store 121, simulated system data store 122, and/or data store 123 may be external to the system server 104 and may communicate via network 110.

The data APIs 124 may comprise various input and output data APIs that may define types of data and/or data objects may be provided by, or received by, various data connectors, data pipelines, data sources, applications, use cases, products, and/or the like. The data APIs 124 may enable determinations of compatibility among, for example, a data source and a use case and/or an application. As used herein, the term "data source" may include any source of data, including but not limited to, data stores, datasets, data assets, databases, data connectors, data pipelines, and/or the like. In various instances, products, use cases, and/or applications may comprise data sources if data is produced by such products, use cases, and/or applications. In various instances, as described herein, data may be transformed or combined by various systems or services, and such transformed and/or combined data may also comprise data sources.

The model simulator 118 may simulate one or more real-world systems 102, and/or other like physical, technical, or logical structures to obtain and/or generate one or more models. In some embodiments, the one or more models may be known (e.g., the relationships, subsystems and/or objects that make up the model based on the real-world systems 102 and/or other like physical, technical, or logical structures that the one or more models may simulate are known). In some embodiments, the one or more models may be black box or unknown (e.g., the relationships, subsystems and/or objects that make up the one or more models based on the real-world systems 102 and/or other like physical, technical, or logical structures that the models may simulate may not be all known such that at least one parameter of the black box models is unknown). In some embodiments, the model simulator 118 may be one or more third party physics and/or simulation engines that may simulate one or more known and/or black box models.

In various embodiments, models may be based on and/or trained based on historical data (e.g., historical cost data, historical quality data (e.g., number of warranty claims for materials from various suppliers), historical sustainability data, and the like).

The subsystem simulator 119 may simulate one or more real-world subsystems 112 and/or other like subsystem structures of the real-world system 102. In some embodiments, the subsystem simulator 119 may extract subsystem data (e.g., data of the physical or logical subsystems, present in the physical system data store 106) to perform the simulation. For example, in the case of an oil well physical system, the subsystem data may include parameters or measured data values originating from an oil well separation subsystem, an oil pumping subsystem, and/or the like.

The object simulator 120 may simulate one or more technical objects (e.g., measuring devices, components etc.) of the real-world subsystem 112 and/or real-world system 102. In some embodiments, the object simulator 120 may extract object data (e.g., measuring device data, logical computation data (e.g., statistical values), etc.) present in the physical system data store 106 to perform the simulation. The data may include unusual or periodic (e.g., some component oscillating) object properties or events that may have occurred (e.g., historical object properties) during operation of the real-world system 102, real-world subsystem 112, or any other structure in which the logical computations, sensors, and/or measuring devices 114 are present. For example, in the case of a supply chain, the technical object properties may include a time that an item or product was shipped from one location to another location, a time that an item or product arrived at a particular location, etc. As another example, in the case of an oil well physical system, the object properties may include sand entering a well during the drilling process, a structural vibration in a component or a piece of equipment of the oil well, a failure of a component or a piece of equipment of the oil well, and/or the like.

The user interface generator 117 may generate user interface code or data that, when executed (e.g., by a user device 108), causes a user device 108 to render and/or display various user interfaces that comprise one or more panels, where the panel(s) may comprise model, subsystem, and/or object data generated or obtained over a period of time. As described herein, the various user interfaces may be generated based on applications, use cases, and/or products, and data sources feeding data objects to those applications, use cases, and/or products. The user interfaces rendered as a result of the user interface code generated by the user interface generator 117 may be "interactive GUIs" or "interactive user interfaces" comprised of one or more panels. The terms "GUI", "interactive GUI", "user interface", and "interactive user interface" may be used interchangeably herein. The one or more panels may display technical objects (e.g., pumps, compressors, valves, machinery, welding stations, vats, containers, products or items, factories, customers, hospitals, etc.) and/or technical object properties (e.g., flow rate, suction temperature, volume, capacity, order volume, sales amounts, sales quantity during a time period (e.g., a day, a week, a year, etc.), patient volume, etc.) simulated by the object simulator 120. The interactive user interface visualizes and allows a user to interact with at least one of an information, schematic, trend, simulation, time, equipment, toolbar, and/or mapping panel. These panels display the subsystems, objects, object properties, inputs, outputs, and/or connections therein of the simulated models.

The interactive user interfaces rendered and/or displayed as a result of the user interface code generated by the user interface generator 117 may include a viewing mode and/or an editing mode. In the viewing mode, the user may view the displayed information, schematic, trend, simulation, time, equipment, toolbar, and/or mapping panels. In the editing mode, the user may edit the displayed information, schematic, trend, simulation, time, equipment, toolbar, and/or mapping panels. These panels and modes lay the framework for how a user can properly visualize and analyze the models at a particular point in time or over a period of time.

For example, the trend panel in the viewing mode may display the trends for one or more technical object properties (e.g., temperature, pressure, flow rate, order volume, sales amounts, sales quantity during a time period (e.g., a day, a week, a year, etc.), patient volume, etc.) of a technical object (e.g., a pump, a product or item, a factory, a customer, a hospital, etc.) for a given period of time (e.g., Monday to Wednesday). In the editing mode, the trend panel may allow the user to edit one or more object properties of an object at a specific time instant (e.g., Monday at noon) or for a period of time (e.g., Monday to Wednesday). The user can further minimize or maximize any panel to optimally achieve the user's display preferences for the system. The user can also markup the system using annotations, change graph line widths to represent different object properties, change the colors or highlighting of various objects or object properties to represent the state (e.g., open, closed, running above specification, running below specification, etc.) of the corresponding object, and/or the like.

The user interface generator 117 may be configured to generate user interface code or data that, when executed, results in additional features being depicted in the rendered and/or displayed interactive user interface. For example, the interactive user interface may allow the user to scroll on any of the displayed panels and/or change a zoom level of the displayed panels to view information at different depths and/or times.

In some embodiments, the interactive user interfaces may be configured to allow a user to view or edit error detection data (e.g., information associated with the detection of a malfunction or miscalibration of measuring devices 114 and/or real-world subsystems 112 depicted in at least one of the displayed panels). For example, the interactive user interfaces can display a message indicating that a fault is detected when such an error is detected by the logical computations, sensors, and/or measuring devices 114 and/or real-world subsystems 112 depicted in at least one of the displayed panels.

The real-world system data store 106 may store the error detection data that may indicate a real-world subsystem 112, logical computation, and/or physical sensor error in one or more real-world systems 102. The real-world systems 102 may be known or transparent systems and/or black box systems.

The model simulator 118 may obtain, generate, and/or simulate one or more models based on the one or more real-world systems 102 and/or the error detection data stored in the real-world system data store 106. The one or more models may be stored in the simulated system data store 122. The error detection data from the real-world system data store 106 may include when the real-world subsystem 112, logical computations, and/or physical sensor error may have occurred over a period of time (e.g., historical sensor error data, live sensor data, real-time sensor data, etc.) and may store this time-series data in the time-series data store 121. The model simulator 118 may transmit the various models and/or data from the time-series data store 121 and/or the simulated system data store 122 to the object simulator 120 to generate objects (e.g., virtual items or products, virtual sensors, virtual measuring devices, etc.) and/or to the subsystem simulator 119 to generate subsystems (e.g., virtual subsystems that may further include the set of virtual logical computations, virtual sensors, virtual measuring devices, etc.). If no real-world subsystem, logical computations, and/or physical sensor error has occurred, the one or more model relationships, subsystems and/or objects may closely mirror the actual real-world subsystem, logical computations, and/or physical sensors. The model simulator 118 may compare actual real-world subsystem 112, logical computations, and/or physical sensor data with simulated data of the one or more simulated models (e.g., data from the generated virtual logical computations, virtual sensors, virtual measuring devices, virtual subsystems, etc.). If the difference between the two datasets is greater than a threshold value, then the model simulator 118 may determine that a virtual subsystem and/or virtual sensor error has occurred. The system server 104 (e.g., the model simulator 118) may use the difference between the two datasets to determine the health of a subsystem (e.g., virtual subsystem), object (e.g., virtual item or product, virtual sensor, etc.), and/or object property (e.g., measurement of the virtual sensor), and display the health on at least one of the displayed panels. The system server 104 (e.g., the model simulator 118) may determine that a smaller difference may result in a healthier subsystem, object, and/or object property, and therefore indicate a healthier model given that these components make up the model.

Additionally the interactive user interfaces may be configured to allow a user to view or edit, in at least one of the displayed panels, unusual (e.g., abnormal) or periodic events that have occurred and/or that may occur in the future during operation of the logical computations, sensors, and/or measuring devices 114 and/or real-world subsystems 112. Such events may also apply to the simulated virtual objects (e.g., virtual items or products, virtual measuring devices, and/or virtual subsystems). For example, in the case of a supply chain, the object properties may include a time that an item or product was shipped from one location to another location, a time that an item or product arrived at a particular location, etc. In the case of an oil well, events may include sand entering a well during the drilling process, a structural vibration in a component or a piece of equipment of the oil well, a failure of a component or a piece of equipment of the oil well, maintenance being performed on a component or equipment of the oil well, deferral of a component or equipment of the oil well, and/or the like. In the case of a manufacturing site, events may include machinery malfunction, a structural vibration in a part of the machinery, changes in manufacturing conditions (e.g., temperature, efficiency, output, etc.), and/or the like. In the case of a vehicle, events may include a component malfunction, a change in a weather condition (e.g., humidity, wind speed, temperature, etc.), a weather phenomenon (e.g., icing, a lightning strike, a large wave, a tornado, etc.), deviations from an expected travel route (e.g., a change from an expected route determined by a navigation system, a change from the flight plan, etc.), a change in fuel efficiency, and/or the like. In the case of a fracking site, events may include the movement of fluids across various depths, changes in the rock layer, equipment failure, and/or the like. In the case of an environmental monitoring and/or researching site, events may include seismic activity (e.g., as caused by tectonic plates, volcanoes, etc.), ice breakage, lava flow, weather phenomena, and/or the like. In the case of a mine, events may include rock movements, rock burst bumps (e.g., seismic jolts within the mine), blasts, micro-seismic events (e.g., events associated with impending ground control problems like roof collapses or other structural failures), equipment failure, and/or the like. In the case of other types of logical computations, sensors, and/or measuring devices 114 and/or real-world subsystems 112, events can include misalignment of parts on a manufacturing machine, trees falling, landslides, mudslides, avalanches, and/or the like. Although several specific cases are mentioned as example events that have occurred and/or that may occur during operation, this is merely illustrative and not meant to be limiting. For example, maintenance, deferral, weather, equipment failure, delivery delays, re-routing of items or products, order cancellation, etc. are other events that may occur in other cases.

The system server 104 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. In one embodiment, the system server 104 may be implemented in a Java Virtual Machine (JVM) that is executing in a distributed or non-distributed computer system. In other embodiments, the system server 104 may be implemented as a combination of programming instructions written in any programming language (e.g., C++, Java, Python, etc.) and hardware components (e.g., memory, CPU time) that have been allocated for executing the program instructions.

A user may use the user computing device 108 to view and interact with the interactive user interfaces. For example, the user device 108 may be in communication with the system server 104 via a network 110. The user device 108 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 108 may execute a browser application to communicate with the system server 104.

In an embodiment, the network 110 includes any communications network, such as the Internet. The network 110 may be a wired network, a wireless network, or a combination of the two. For example, network 110 may be a local area network (LAN) and/or a wireless area network (WAN). The network 110 may include cables and/or other equipment that allow the transport of data from underwater locations to above-ground locations and/or vice-versa. For example, the network 110 may include one or more firewalls (e.g., a firewall that provides an interface between the real-world system 102 and the other components of the network 110 and/or a firewall that provides an interface between the other components of the network 110 and the system server 104 and/or the physical system data store 106) and/or an endpoint server, such as a secure HTTP endpoint system.

In various implementations, the various aspects of the computing environment 100 (e.g., the system server 104, and the like) may be implemented in various ways. For example, the system server 104 may be implemented as a single computing system, and/or various functions or services of the system server 104 may be split up and/or arranged differently from that shown in the example computing environment 100 of FIG. 1. Thus, for example, while in FIG. 1 the physical system data store 106, the time-series data store 121, the simulated system data store 122, and the data store 123 are shown as being implemented in particular respective components of the computing environment 100, in other implementations the data stores may combined, separated into additional data stores, and/or the like. As another example, the various components of the system server 104 may be combined and/or separated in additional components/services, and/or may be implemented in different ones of the various systems of the present disclosure. However, for the purpose of providing a concise description in the present disclosure, the various functionalities are described in reference to the example implementation shown in the computing environment 100 of FIG. 1.

As used herein, the terms "server" and "system" generally refer to the system server 104, but various implementations may also include various other aspects of the computing environment 100 and/or other computer systems of the present disclosure.

As noted above, simulations may be performed by a user by providing simulated values for attributes that are then evaluated by multiple chained models to simulate outputs. As discussed further herein, the optimization component 116 provides optimization functionality that enables automatic exploration of a problem space resulting in one or more recommended actions that may be performed based on key performance indicators ("KPIs") or other key metrics. For example, in the supply chain example, an optimization may enable the user to find a precise price point that satisfies multiple targets, such as (1) optimizing revenue (2) without going under inventory limits.

An optimization may be performed by evaluating thousands (or more) scenarios, with each scenario representing a different set of possible actions. For every scenario, a simulation chains together several models and calculates metrics, such as the one or more key metrics that are being optimized. One output of the optimization engine may be a set of actions associated with the optimal scenario, which may be presented as a recommendation to the user. For example, the actions may include the same types of simulated changes that a user may manually simulate, and may be accepted by the user in a similar manner as other simulated changes.

Additional details of example functionality and implementations of various aspects of the computing environment 100 (e.g., the system server 104, and the like), including various example GUIs, applications, use cases, methods, and processes, are described in U.S. patent application Ser. No. 17/447,105, which is incorporated by reference herein. Additional details regarding optimization component 116 and its functionality related to neural networks and artificial intelligence, and generating data for display in various application user interfaces, are described in U.S. patent application Ser. No. 17/447,105, which is incorporated by reference herein.

Additional details of example functionality and implementations of various aspects of the computing environment 100 (e.g., the system server 104, and the like) are also described below, including in reference to FIGS. 2A-2C, 3, 4A-4D, 10A-10C, 11, and 12A-12B. Additionally, various example GUIs, applications, use cases, methods and processes, and other functionality are also described below in reference to the various other figures to illustrate various aspects and functionality of the system. In various implementations, various GUIs, functionality of the GUIs, and/or other aspects of the GUIs, applications, use cases may be combined in various ways, some of which are described below as illustrative examples.

IV. Additional Example Aspects of the System Server

In various implementations, the system of the present disclosure may employ a data model and/or an ontology 152, examples of which are described below. This description is provided for the purpose of providing an example and is not intended to limit the techniques to the example data model, the example system server 104, or the example system's use of an ontology to represent information.

In some embodiments, a body of data is conceptually structured according to an object-centric data model represented by ontology 152. The conceptual data model can be independent of any particular database used for durably storing one or more database(s) 150 based on the ontology 152. For example, each object of the conceptual data model may correspond to one or more rows in a relational database, or an entry in Lightweight Directory Access Protocol (LDAP) database or other type of database, or any combination of one or more databases.

Figure 2A:
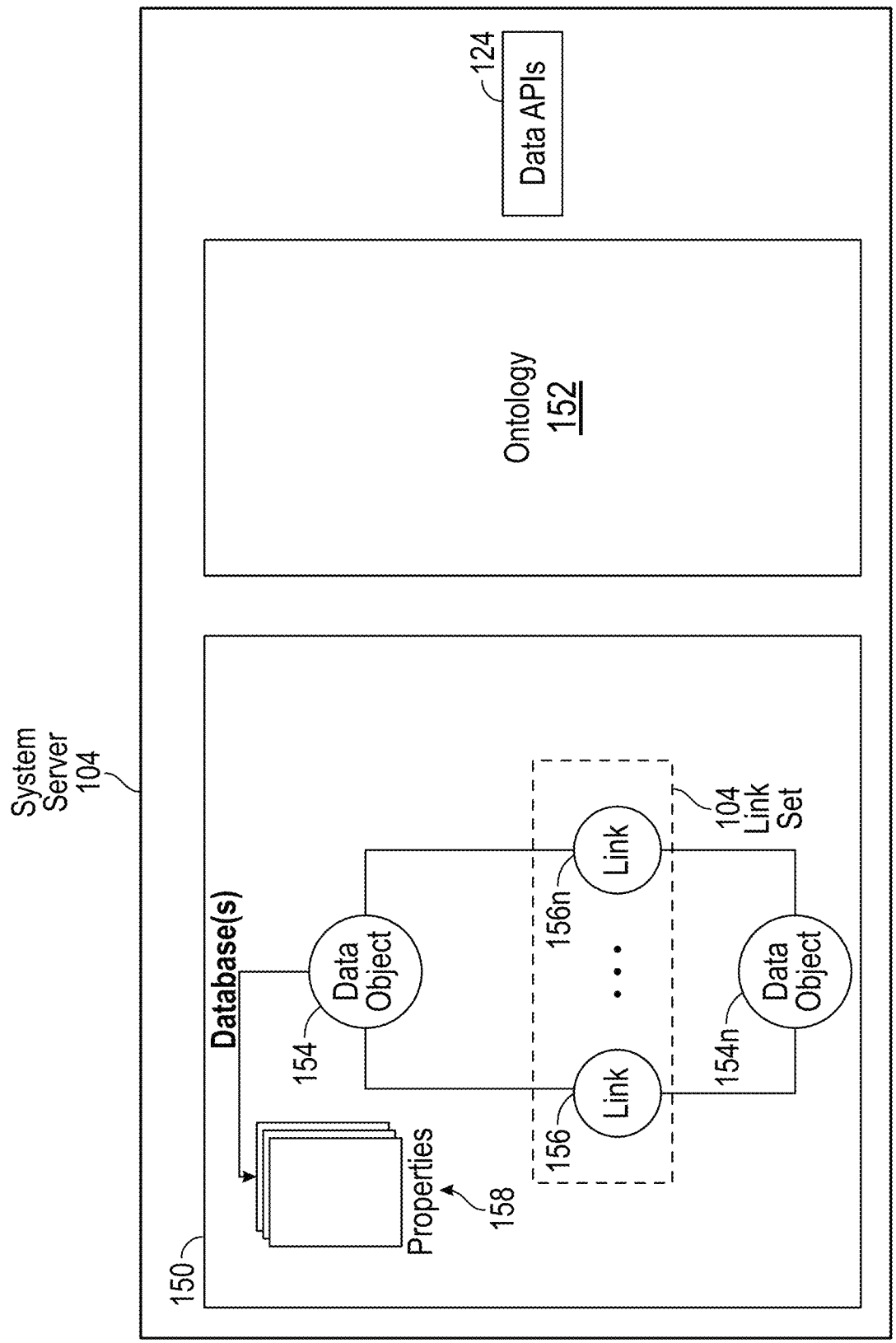
FIG. 2A shows a block diagram illustrating example optional aspects of a system server, including an example object-centric conceptual data model, according to one or more embodiments of the present disclosure.

FIG. 2A shows a block diagram illustrating example additional optional aspects of the system server 104, including an example object-centric conceptual data model, according to one or more embodiments of the present disclosure. An ontology 152, as noted above, may include stored information providing a data model for storage of data in a database 150. According to various implementations, the database 150 may be comprised in any or one or more of the data stores of the example computing environment 100 described above, or separately from those data stores. The ontology 152 may be defined by one or more object types, which may each be associated with one or more property types. At the highest level of description, data object 154 is a container for information representing things in the world. For example, data object 154 can represent an entity such as a person or user, a place, a group, an organization, a resource, a data asset, a request, a purpose, a link, or other noun. Data object 154 can represent an event that happens at a point in time or for a duration. Data object 154 can represent a document or other unstructured data source such as an e-mail message, a news report, or a written paper or article. Each data object 154 is associated with a unique identifier that uniquely identifies the data object within the access management system.

Different types of data objects may have different property types. For example, a "Person" data object might have an "Eye Color" property type and an "Event" data object might have a "Date" property type. Each property 158 as represented by data in the system server 104 may have a property type defined by the ontology 152 used by the database 150.

Objects may be instantiated in the database 150 in accordance with the corresponding object definition for the particular object in the ontology 152. For example, a specific folder (e.g., an object of type "Data Asset") at "C:\Folder" (e.g., a property of type "directory") may be stored in the database 150 as a data asset object metadata as defined within the ontology 152.

The data objects defined in the ontology 152 may support property multiplicity. In particular, a data object 154 may be allowed to have more than one property 158 of the same property type. For example, a "Person" data object might have multiple "Address" properties or multiple "Name" properties.

Each link 156 represents a connection between two data objects 154. In some embodiments, the connection can be through a relationship, an event, a property, or through matching properties. A relationship connection may be asymmetrical or symmetrical. For example, "Person" data object A may be connected to "Person" data object B by a "Boss Of" relationship (where "Person" data object B has an asymmetric "Boss Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Office" data object representing a particular office if they worked at the same place, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing accountants at a firm, may both have a "CPA Qualified" property that indicates that both of them have CPA licenses. If both people work at the same office, then their "Office Address" properties likely contain similar, if not identical property values. In some embodiments, a link between two data objects may be established based on similar or matching properties (e.g., property types and/or property values) of the data objects. These are just some examples of the types of connections that may be represented by a link, and other types of connections may be represented; embodiments are not limited to any particular types of connections between data objects. For example, a document might contain references to two different objects. For example, a document may contain a reference to an event (one object), and a person (a second object). A link between these two objects may represent a connection between these two entities through their co-occurrence within the same document.

Each data object 154 can have multiple links with another data object 154 to form a link set. Each link 156 as represented by data in a database may have a link type defined by the database ontology used by the database.

In various implementations, the system server 104 may include various data APIs 124, which may optionally be based on the ontology 152. The data APIs 124 may comprise various input and output data APIs that may define types of data and/or data objects may be provided by, or received by, various data connectors, data pipelines, data sources, applications, use cases, products, and/or the like. The data APIs 124 may include indications of, for example, particular data object types and associated properties. The data APIs 124 may be used to determine compatibility among, for example, a data source and a use case and/or an application.

Figure 2B:
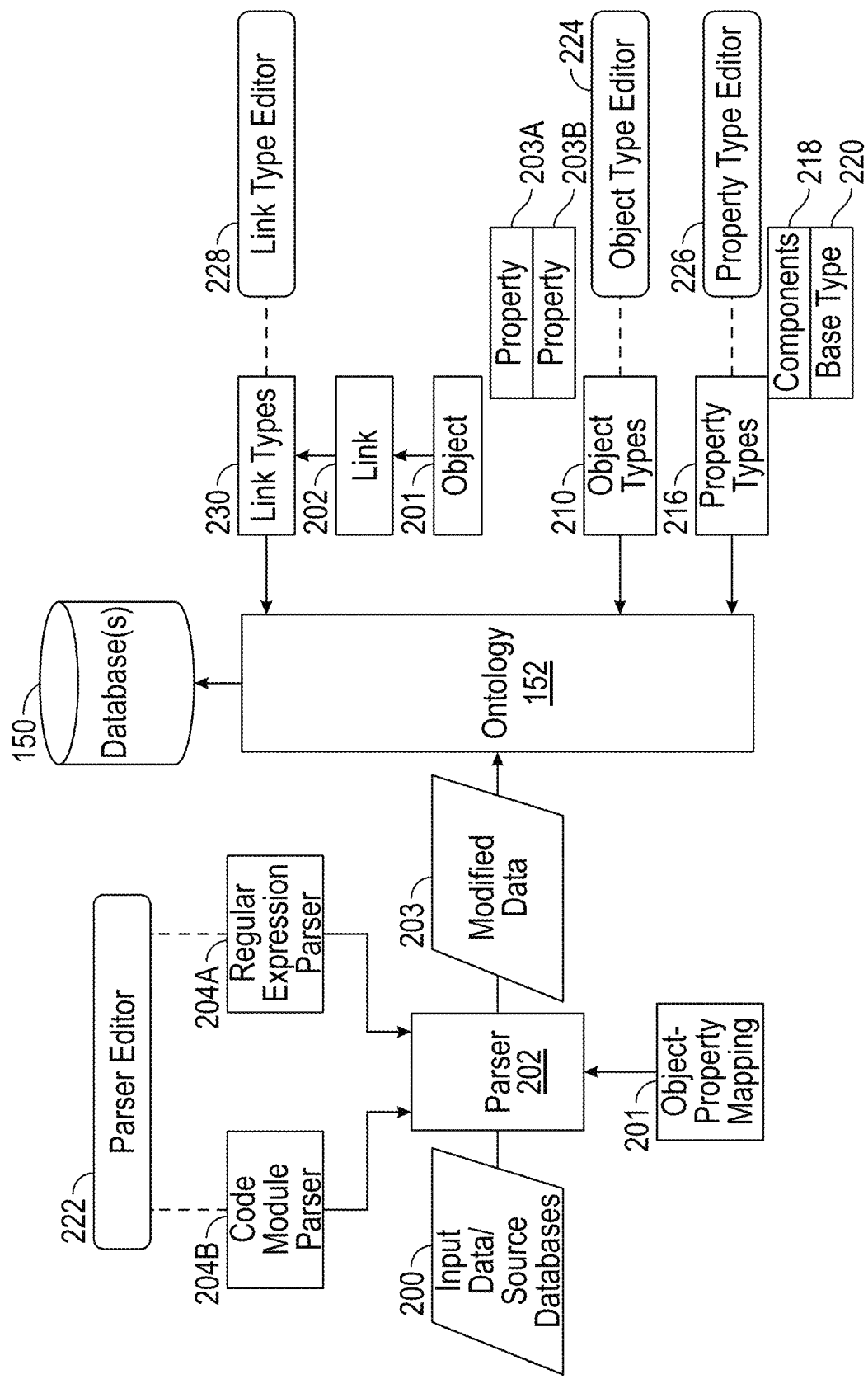
FIG. 2B shows a block diagram illustrating example components and data that may be used in identifying and storing data according to an ontology, according to one or more embodiments.

FIG. 2B shows a block diagram illustrating example components and data that may be used in identifying and storing data according to an ontology, according to one or more embodiments. In this example, the ontology may be configured, and data in the data model populated, by a system of parsers and ontology configuration tools. In the embodiment of FIG. 2B, input data 200 is provided to parser 202. The input data may comprise data from one or more sources. For example, a rental car institution may have one or more databases with information on calendar entries, rental cars, and people. The databases may contain a variety of related information and attributes about each type of data, such as a "date" for a calendar entry, an address for a person, and a date for when a rental car is rented. The parser 202 is able to read a variety of source input data types and determine which type of data it is reading.

In accordance with the discussion above, the example ontology 152 comprises stored information providing the data model of data stored in database 150, and the ontology is defined by one or more object types 210, one or more property types 216, and one or more link types 230. Based on information determined by the parser 202 or other mapping of source input information to object type, one or more data objects 154 may be instantiated in the database 150 based on respective determined object types 210, and each of the objects 154 has one or more properties 158 that are instantiated based on property types 216. Two data objects 154 may be connected by one or more links 156 that may be instantiated based on link types 230. The property types 216 each may comprise one or more data types 218, such as a string, number, etc. Property types 216 may be instantiated based on a base property type 220. For example, a base property type 220 may be "Locations" and a property type 216 may be "Home."

In some embodiments, an administrator of the system (e.g., a user with the proper role and/or permissions) uses an object type editor 224 to create and/or modify the object types 210 and define attributes of the object types. In some embodiments, an administrator of the system uses a property type editor 226 to create and/or modify the property types 216 and define attributes of the property types. In some embodiments, an administrator of the system uses link type editor 228 to create the link types 230. Alternatively, other programs, processes, or programmatic controls may be used to create link types and property types and define attributes, and using editors is not required.

In some embodiments, creating a property type 216 using the property type editor 226 involves defining at least one parser definition using a parser editor 222. A parser definition comprises metadata that informs parser 202 how to parse input data 200 to determine whether values in the input data can be assigned to the property type 216 that is associated with the parser definition. In an embodiment, each parser definition may comprise a regular expression parser 204A or a code module parser 204B. In other embodiments, other kinds of parser definitions may be provided using scripts or other programmatic elements. Once defined, both a regular expression parser 204A and a code module parser 204B can provide input to parser 202 to control parsing of input data 200.

Using the data types defined in the ontology, input data 200 may be parsed by the parser 202 determine which object type 210 should receive data from a record created from the input data, and which property types 216 should be assigned to data from individual field values in the input data. Based on the object-property mapping 201 (including properties 208A, 208B), the parser 202 selects one of the parser definitions that is associated with a property type in the input data. The parser parses an input data field using the selected parser definition, resulting in creating new or modified data 203. The new or modified data 203 is added to the database 150 according to ontology 152 by storing values of the new or modified data in a property of the specified property type. As a result, input data 200 having varying format or syntax can be created in database 150. The ontology 152 may be modified at any time using object type editor 224, property type editor 226, and link type editor 228, or under program control without human use of an editor. Parser editor 222 enables creating multiple parser definitions that can successfully parse input data 200 having varying format or syntax and determine which property types should be used to transform input data 200 into new or modified input data 203.

Figure 2C:
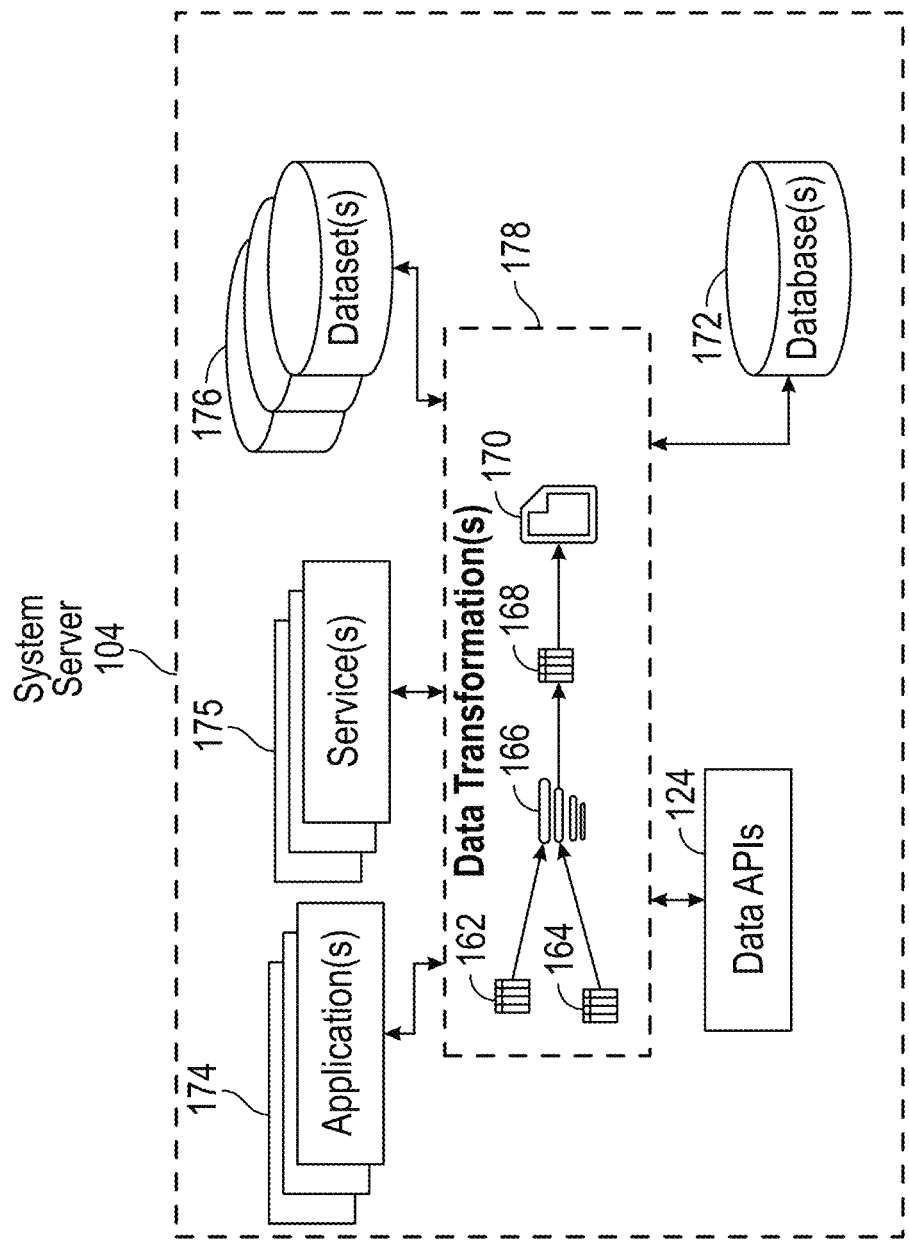
FIG. 2C shows a block diagram illustrating example optional aspects of the system server, according to one or more embodiments.

FIG. 2C shows a block diagram illustrating example additional optional aspects of the system server 104 related to data management, according to one or more embodiments. The example data management functionality of the system server 104 can include one or more applications 174, one or more services 175, one or more initial datasets 176, and a data transformation process 178 (also referred to herein as a build process). The example data management functionality can also include a data pipeline system. The system can transform data and record the data transformations. The one or more applications 174 can include applications that enable users to view datasets, interact with datasets, filter data sets, and/or configure dataset transformation processes or builds. The one or more services 175 can include services that can trigger the data transformation builds and API services for receiving and transmitting data (which API services may include the data APIs 124). The one or more initial datasets 176 can be automatically retrieved from external sources and/or can be manually imported by a user. The one or more initial datasets 176 can be in many different formats such as a tabular data format (SQL, delimited, or a spreadsheet data format), a data log format (such as network logs), or time series data (such as sensor data).

Via the one or more services 175, the system can apply the data transformation process 178. An example data transformation process 178 is shown. The system server 104 can receive one or more initial datasets 162, 164. The system can apply a transformation to the dataset(s). For example, the system can apply a first transformation 166 to the initial datasets 162, 164, which can include joining the initial datasets 162, 164 (such as or similar to a SQL JOIN), and/or a filtering of the initial datasets 162, 164. The output of the first transformation 166 can include a modified dataset 168. A second transformation of the modified dataset 168 can result in an output dataset 170, such as a report or a joined table in a tabular data format that can be stored in one or more database(s) 172. Each of the steps in the example data transformation process 178 can be recorded by the system and made available as a resource or data asset. For example, a data asset can include a dataset and/or a dataset item, a transformation, or any other step in a data transformation process. As mentioned above, the data transformation process or build 178 can be triggered by the system, where example triggers can include nightly build processes, detected events, or manual triggers by a user. Additional aspects of data transformations and the system are described in further detail below.

The techniques for recording and transforming data in the system may include maintaining an immutable history of data recording and transformation actions such as uploading a new dataset version to the system and transforming one dataset version to another dataset version. The immutable history is referred to herein as "the catalog." The catalog may be stored in a database. Preferably, reads and writes from and to the catalog are performed in the context of ACID-compliant transactions supported by a system. For example, the catalog may be stored in a relational database managed by a relational database system that supports atomic, consistent, isolated, and durable ("ACID") transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the system multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data ("DAG") structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The system can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The system may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the system to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

The various data assets (e.g., files, data items, datasets, portions of datasets, transformations, and/or the like) of the system may also be stored in the database(s) 172. According to various implementations, the database(s) 172 may be comprised in any or one or more of the data stores of the example computing environment 100 described above, or separately from those data stores.

The system can include various permissioning functionalities. For example, the system can implement access control lists and/or other permissioning functionality that can enable highly granular permissioning of data assets (e.g., files, data items, datasets, portions of datasets, transformations, and/or the like). The permissioning may include, for example, specific permissions for read/write/modify, and/or the like, which may be applicable to specific users, groups of users, roles, and/or the like.

As noted above, as used herein the term "data source" may include any source of data, including but not limited to, data stores, datasets, data assets, databases, data connectors, data pipelines, and/or the like. In various instances, products, use cases, and/or applications may comprise data sources if data is produced by such products, use cases, and/or applications. In various instances, as described herein, data may be transformed or combined by various systems or services, and such transformed and/or combined data (which may come from various data connectors or data pipelines, as described above) may also comprise data sources.

V. Example Implementations of Use Cases and Applications

As noted above, disclosed herein are various systems, computer program products, and computer-implemented methods for efficiently generating interactive graphical user interfaces, software-based workflows, and data integrations using, for example, catalogs of workflow applications and auto-generation of aspects of the workflows. The system can include a catalog of use cases and/or applications that allow the user to traverse the system platform (of numerous workflows, data sources, data analyses, software tools and functions, dashboards, interactive software and user interfaces, and/or the like), to rapidly achieve specific outcomes and deliver user-facing workflows. Using the system, deployment of a use case and/or application may be accomplished without writing any code. The catalog of use cases can be a catalog of templated implementations of products/applications. The templates can be end-to-end templates that start from the object layer and extend to end-user applications.

FIGS. 4A-4D show block diagrams illustrating example aspects of the system related to products, applications, use cases, and data integration, according to one or more embodiments.

Figure 4A:
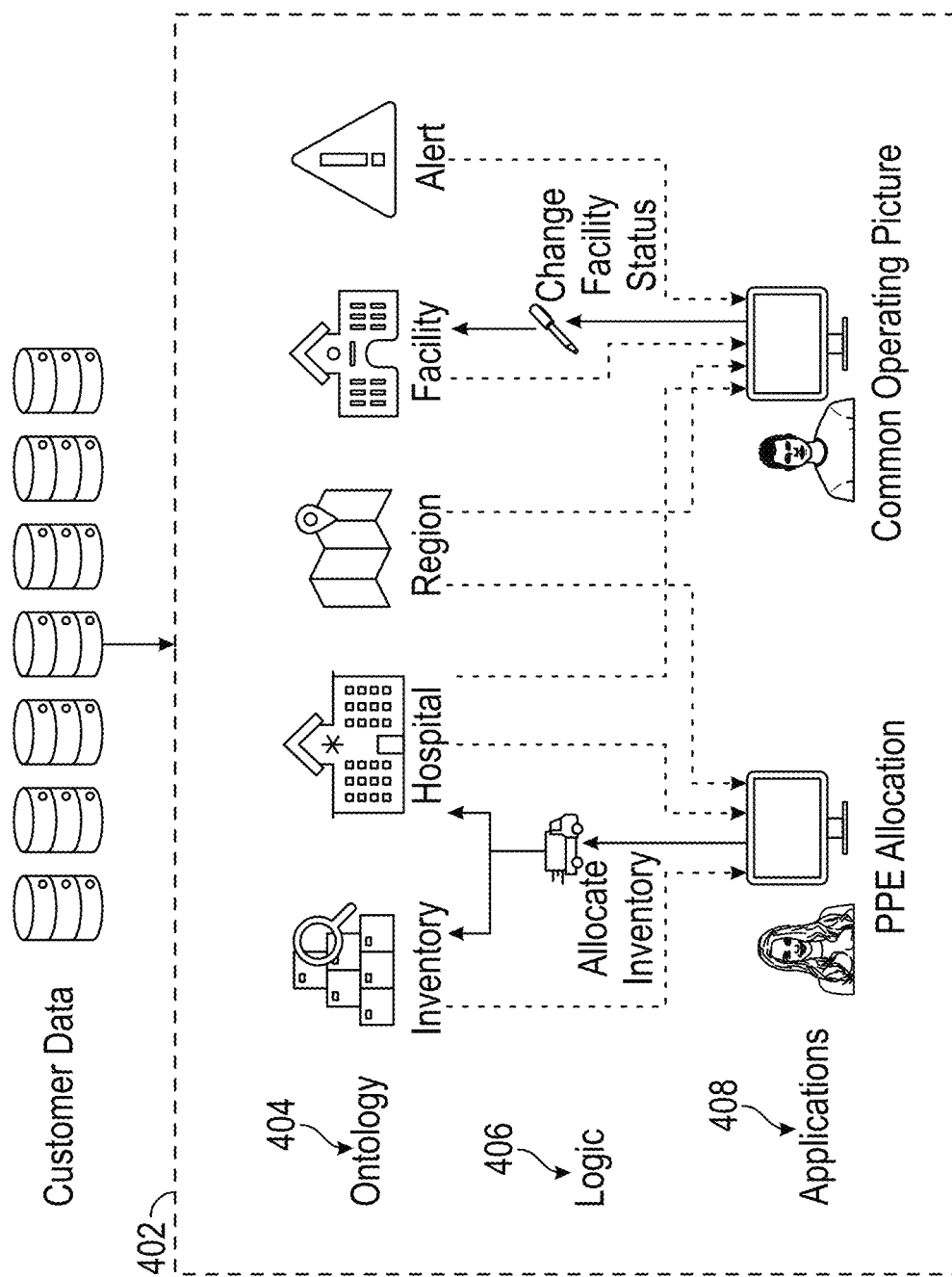

FIG. 4A shows an example high-level view of the system in which customer data can be fed into the system (as indicated by box 402). The system can then apply an ontology 404 to that customer data, which can include various pre-defined data object types. Various types of logic 406 can link those data objects and data object types into various applications 408. Those applications can comprise product templates, which can be based on various reusable products or reusable components of products of the system. The logic and/or product templates can include various data APIs, functions, models, user actions, interactive graphical user interfaces, and/or the like. Advantageously, the products and application templates can enable the system to automatically generate the information needed to generate a workflow and various interactive graphical user interfaces, when linked up with various data object types and data sources. The product templates (also referred to herein as "applications") can be grouped into use cases. Examples of use cases in the catalog can include, e.g., Supply Chain, Opportunity Management, Inventory Management, Portfolio Optimization, KYC (Know Your Customer), Anti-Money Laundering, Readiness, Equipment, People, Shipping & Asset Management, Manufacturing, Quality Management, Dynamic Production Planning, and Root Cause Analysis, among others.

Figure 4C:
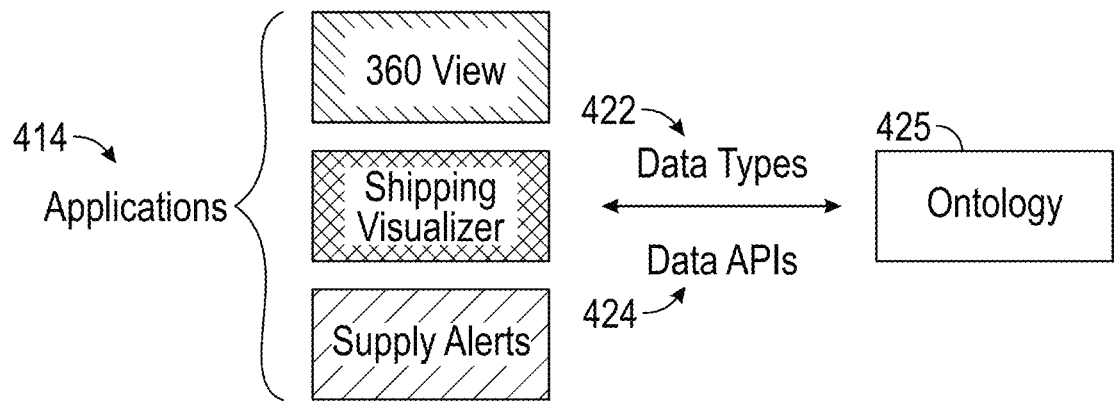
Figure 4D:
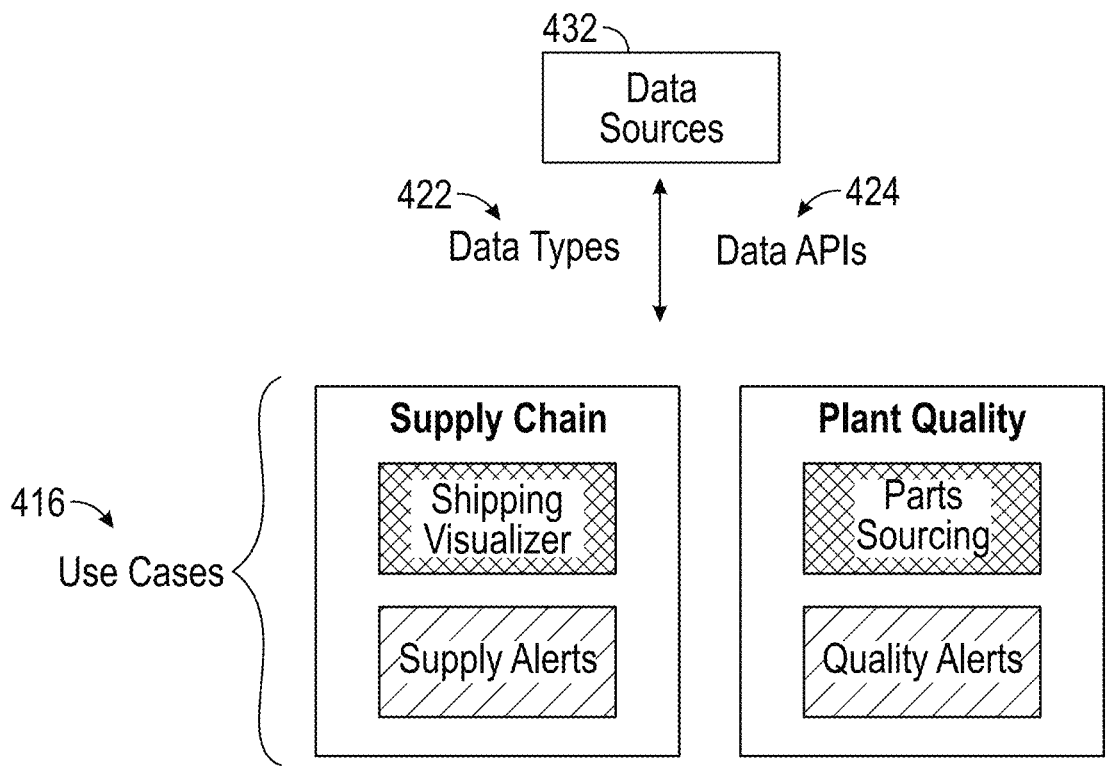

FIGS. 4B-4D illustrate additional details regarding various example implementations of the system. As shown in FIG. 4B, the system may include various reusable "products" 412, which products may include various reusable components or items of software that may be configured in various ways, and which provide various types of software functionality. Examples of such reusable products or components of products include a "dashboard builder" (which may be used to build/provide various types of data visualization dashboards), a "geospatial map" (which may be used to build/provide various types geospatial map-based interactive software and associated analyses), an "object graph" (which may be used to build/provide various types of node and edge graphs of data objects and associated analyses), a "data analysis" (which may include "programming notebook"-type functionality, among other functionality, for building/providing various types of sequential data analyses), an "alerts viewer" (which may be used to build/provide various types of alerts indications and functionality, including viewing details associated with alerts), and/or the like. Each of the products may be customizable depending on a needed use. For example, the products may be configured to receive certain types of data inputs, provide certain types of data outputs, provide certain types of data visualizations, provide certain types of interactive user interface functionality, have certain user interface organization and/or modules, and/or the like.

Accordingly, the products may be "templatized" in the system, meaning that each of the products may be preconfigured in various ways to comprise "templates" depending on various use cases. These product templates are referred to herein as "applications" 414. Thus, the products of the system may effectively provide base-level building blocks for various "applications". The products may be used multiple times, in multiple applications, and may be customized for each application. Thus, as shown in the example diagram below, the "dashboard builder" product is used for a "360 view" application, the "geospatial map" product is used for a "shipping visualizer" application and also for a "parts sourcing" application, and the "alerts viewer" product is used for a "supply alerts" application and also for a "quality alerts" application. In various implementations, multiple products may be used to build a single application. Again, as mentioned above, the "applications" themselves comprise templates. Just as the products may each be implemented/configured/employed in multiple applications/configurations/templates, the applications may each be implemented/employed in various instantiations by being hooked up to different data sources, as further explained below. The products and applications shown below are only examples for illustrative purposes, and various other types of products and/or applications may be possible in the system.

In the example diagram of FIG. 4B, the example applications include a "360 view" application (which may provide an overview of the particular system or organization in a dashboard-type interactive user interface), a "shipping visualizer" application (which may provide a visualization of shipping routes and goods movements in a geospatial map-type interactive user interface), a "parts sourcing" application (which may provide a visualization of sources of parts and movements of parts in a geospatial map-type interactive user interface), a "supply alerts" application (which may provide a selectable/actionable listing of alerts associated with a supply chain, and associated detailed information, in an alerts-type interactive user interface), a "quality alerts" application (which may provide a selectable/actionable listing of alerts associated with a quality assurance in a manufacturing scenario, and associated detailed information, in an alerts-type interactive user interface), and/or the like.

The products can comprise a library of configurable software functionalities that may be used to build applications. The applications can comprise a library of pre-configured or templatized products for certain use cases. As mentioned above, each of the "applications" comprises a template that may be instantiated/used multiple times. Thus, the system can then further organize the applications into "use cases" 416, each of which may comprise groups of one or more of the applications that may be useful for a given use case. In the example diagram of FIG. 4B, three example "use-cases" are given, including "supply chain" (which could usefully include the "shipping visualizer" and "supply alerts" applications), "plant quality" (which could usefully include the "parts sourcing" and "quality alerts" applications), and "view" (which could usefully include the "360 view" and "quality alerts" applications). Other products, applications, and use cases are contemplated and possible with the system, and the examples described herein are given for illustrative purposes only.

Along the lines mentioned above, the "use cases" can comprise a library of groups of applications that may be used together for various use cases. Multiple users can each individually instantiate one or more of the various use cases (and thereby also one or more of the various applications within those use cases), depending on their needs.

Advantageously, and as further described below, a user of the system may select a particular use case depending on their needs, and may then be presented with a list of suggested associated applications with may be useful for their needs. The user may then, as further described below, simply provide the data sources expected by the applications, and the system may then automatically provide all the useful functionality of the applications to the user with no further configuration needed. Thus, the system may efficiently provide significant functionality to a user without the user having to write code and/or configure each product available in the system. Additionally, multiple users may be able to take advantage of new or improved products, applications, and/or use cases as they are added to the system, without individual configuration and coding, providing greater efficiency and use of computing resources.

In various implementations, the use cases may be further grouped into groups of related use cases, to helpfully guide a user to related use cases (and thereby also their related applications) that may be useful to a user depending on the user's needs.

As explained above, each of the "applications" comprises a template, including a particular configuration of a base product to make the product useful and customized for a particular use case. The "applications" can include specifications of expected data types. In some implementations, the specifications can comprise data APIs. As shown in the example illustration of FIG. 4C, the data types 422 and/or data APIs 424 may be defined and/or drawn from an ontology 425 of the system. The ontology may include various data types (also referred to herein as data object types), and may define various properties associated with those data types. The ontology may further define data types associated with the properties. The ontology may further define various types of actions associated with each of the data types. The ontology may further define relationships among the various data types. The ontology may include hierarchical relationships among the various data types.

Because the data types are defined by the ontology in the system, the application configurations may include associations with data types from the ontology, and/or the data APIs may be based on data types from the ontology. The definitions of the data types and/or data APIs are useful because the application can be configured based on the type of information and its associated properties, so that when actual data of the type defined is received by an instantiation of the application, proper application functionality can be provided. Data types and/or data APIs may be common among multiple applications, and thus, advantageously, and as further explained below, when multiple applications are instantiated by a user (e.g., as part of a use case), providing a data source of a particular data type can provide data of that data type to multiple applications in only a single action by the user. Advantageously, because the ontology is centralized and common to the products and/or applications of the system, the ontology can be updated in a single place/instance (e.g., when a data type is added or updated), which update can then be automatically applied to all the products/applications, increasing the operational efficiency of the system.

Additionally, data APIs can be used to determine compatibility among data sources and applications, and may also be used to provide suggestions to a user of applications that may be instantiated given the available data sources.

As mentioned above, and as shown in the example illustration of FIG. 4D, when a user instantiates use cases and/or applications 416, or one or more applications of a use case, the user may link particular data source(s) 432 to the application or use case. Such linking may be based on data types 422 and/or data APIs 424. For example, the user may identify a data source that provides data of the data type used by the application (e.g., as indicated by a configuration, definition, of data API of the application). The system may then, advantageously, automatically bring data of that data type into the application(s) and populate the application(s), providing significant functionality to the user without further configuration. As mentioned, within a given use case, identification of data sources for a given data type may allow the system to automatically feed data into multiple application associated with the use case, requiring even less configuration by the user. Further, as also mentioned above, when new applications are added to the system, if data types for those new applications are already defined in a given user's use case instantiation, the application may be instantly deployed with no further action by the user.

Applications provided by the system may include various functionality, including various modeling and simulation functionality, as described herein. The applications can include various interactive graphical user interface and associated functionality for, e.g., visualizing and interacting with various inputs and outputs, running simulations, optimizing simulations, and automatically determining and implementing recommendations. The optimization and simulation aspects may be based on multiple models that can collectively represent a real-world system, e.g., a real-world technical system. For example, live sensor data can be provided as an input to one or more of the simulated models which represent, for example, a technical system in the real world. In response, graphical user interfaces ("GUIs") may be generated that can include, for example, graph-based GUIs, map-based GUIs, and panel-based GUIs, among others. Additional examples and details regarding such applications are provided in U.S. patent application Ser. No. 17/447,105, which is incorporated by reference herein.

VI. Example Interactive Graphical User Interfaces and Functionality

FIGS. 5A-5B, 6A-6C, 7A-7H, 8, and 9A-9B illustrate example interactive graphical user interfaces, according to one or more embodiments. To provide a better understanding of the system and its functionality, example implementations of the system are described below in reference to various example interactive graphical user interfaces, with their associated functionality, features, and advantages. The examples user interfaces are provided for illustrative purposes to show various functionalities of the system. In other implementations, the interactive graphical user interfaces may include more or fewer elements, may be arranged differently, and/or may be combined or divided. The various example interactive graphical user interfaces may be implemented, for example, via the system server 104 (including one or more components of the system server 104, such as optimization component 116, user interface generator 117, model simulator 118, etc.) described above, and the various processes described throughout the present disclosure.

Herein are provided descriptions of example implementations, features, and advantages associated with various graph-based, map-based, alert-based, panel-based, and optimization interactive GUIs. While certain features and functionality may be described in reference to one or more, but not all, of the example GUIs in the interest of conciseness, it is to be understood that the various features and functionality may be implemented across some or all of the various example GUIs.

Figure 5A:
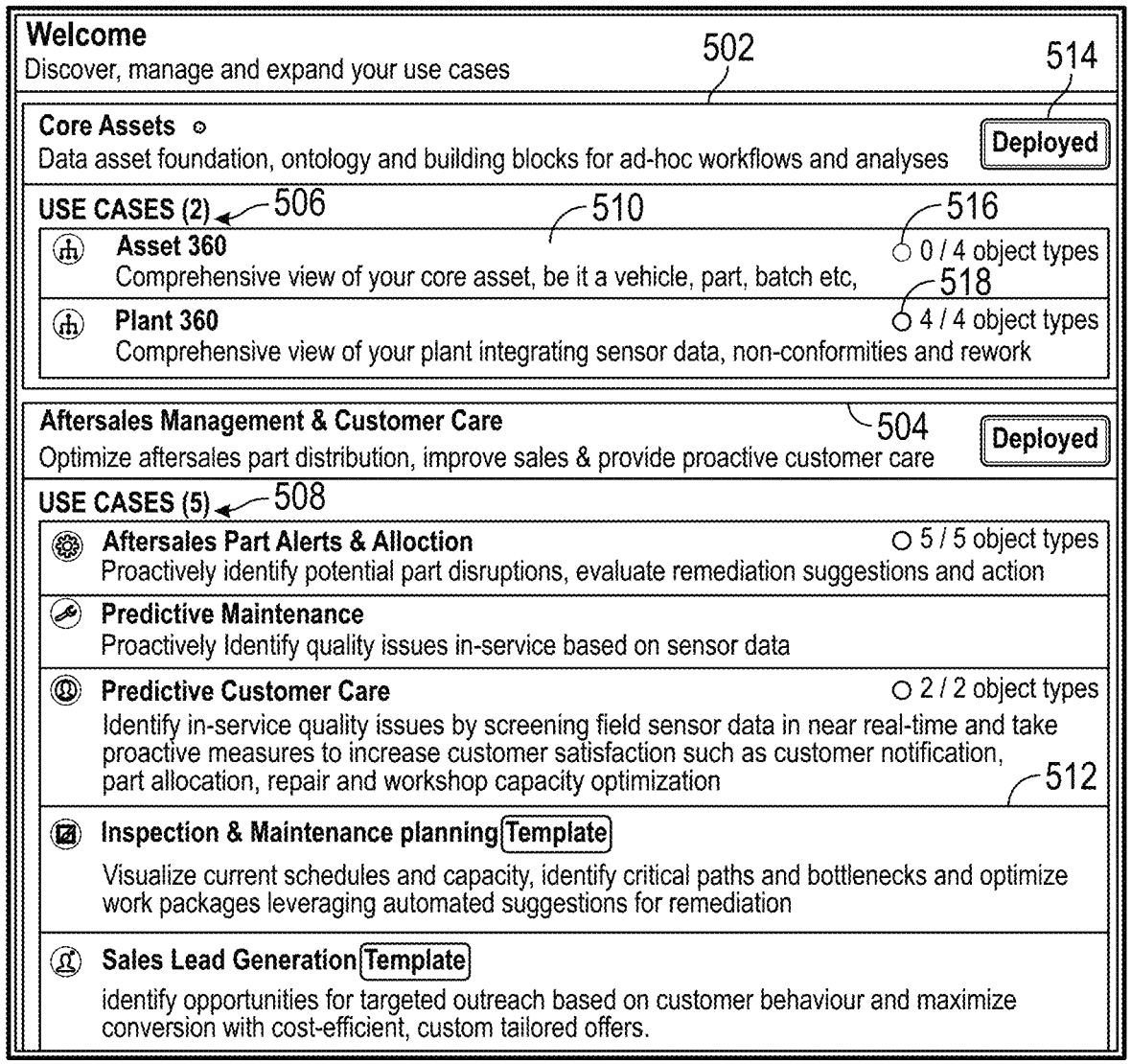
Figure 5B:
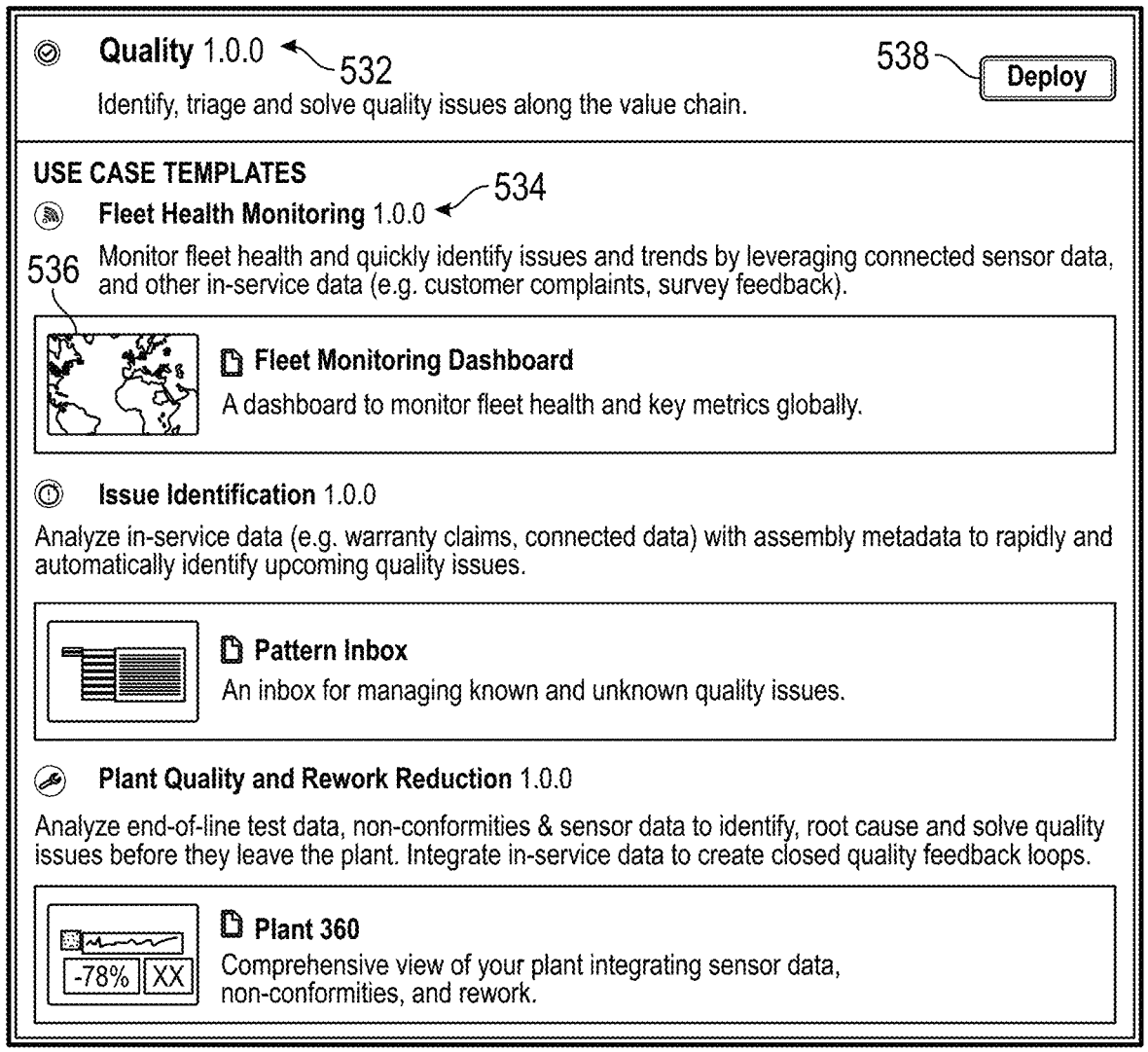

FIGS. 5A-5B illustrate example interactive graphical user interfaces associated with accessing various use cases, applications, configurations, and/or the like. Referring to FIG. 5A, an example user interface is shown in which there are listed multiple examples of groups of use cases, including, e.g., "core assets" 502, and "aftersales management & customer case" 504. Within each group of use cases are listed the associated use cases 506, 508, e.g., within "core assets" are listed "asset 360" 510 and "plant 360", etc. The example interactive graphical user interface also includes indications of whether the various use cases are deployed (e.g., deployed 514 vs. "template" 512), and whether object types that are associated with the various use cases (i.e., associated with the applications within those use cases) are linked to data sources (see, e.g., indicators 516, 518). In some instances, the system may also include "beta" next to a use case and/or application, indicating that it is new or in development.

Each of the elements of the example interactive graphical user interface of FIG. 5A may be selectable, such that a user may, for example, select one of the listed groups or use cases and/or one of the listed use cases. In response to a user's selection, the system may update the GUI to enable the user to, e.g., view a list of use cases and/or applications associated with a selected group of use cases, view a list of applications associated with a selected use case, access a particular application or group of applications associated with a selected use case, configure a particular use case, application, or group of applications associated with a selected use case, and/or the like. Additional example of these various possibilities are described below. The functionality provided upon a user's selection of a use case may be based on whether or not a use case or application is configured or deployed. "Deployed" may indicate that the use case or one or more applications of the use case are configured and linked to data sources such that those one or more applications may be populated and function.

FIG. 5B illustrates an example user interface that may be shown in response to a user's selection of a group of use cases (e.g., a "quality" group of use cases 532) in the user interface of FIG. 5A. The user interface of FIG. 5B may comprise an updated user interface and/or a popup or overlay. The example interactive graphical user interface of FIG. 5B includes details of the group of use cases, including a list of the use cases (e.g., "fleet health monitoring" 534) and the applications (e.g., "fleet monitoring dashboard" 536) associated with each of those use cases. In the example of FIG. 5B, the use cases in the selected "quality" group of use cases include, e.g., "fleet health monitoring", "issue identification", etc. Within those use cases, related applications include, e.g., "fleet monitoring dashboard" (within the "fleet health monitoring" use case), "pattern inbox" (within the "issue identification" use case), etc. The various indications of use cases and applications of FIG. 5B may be selectable, such that a user may access and/or configure those various use cases and/or applications as described herein.

Additionally, using interactive graphical user interfaces such as those of FIGS. 5A-5B, the user may select to deploy a particular application, use case, and/or group of use cases. Thus, for example, the user may select to deploy the "quality" group of use cases, e.g., via selection of button 538. In response, the system may present the user with various interactive user interfaces by which the user may interactively configure various use cases and/or applications by, for example, associating data sources with data object types expected by the applications within the use case(s)/application(s).

Figure 6A:
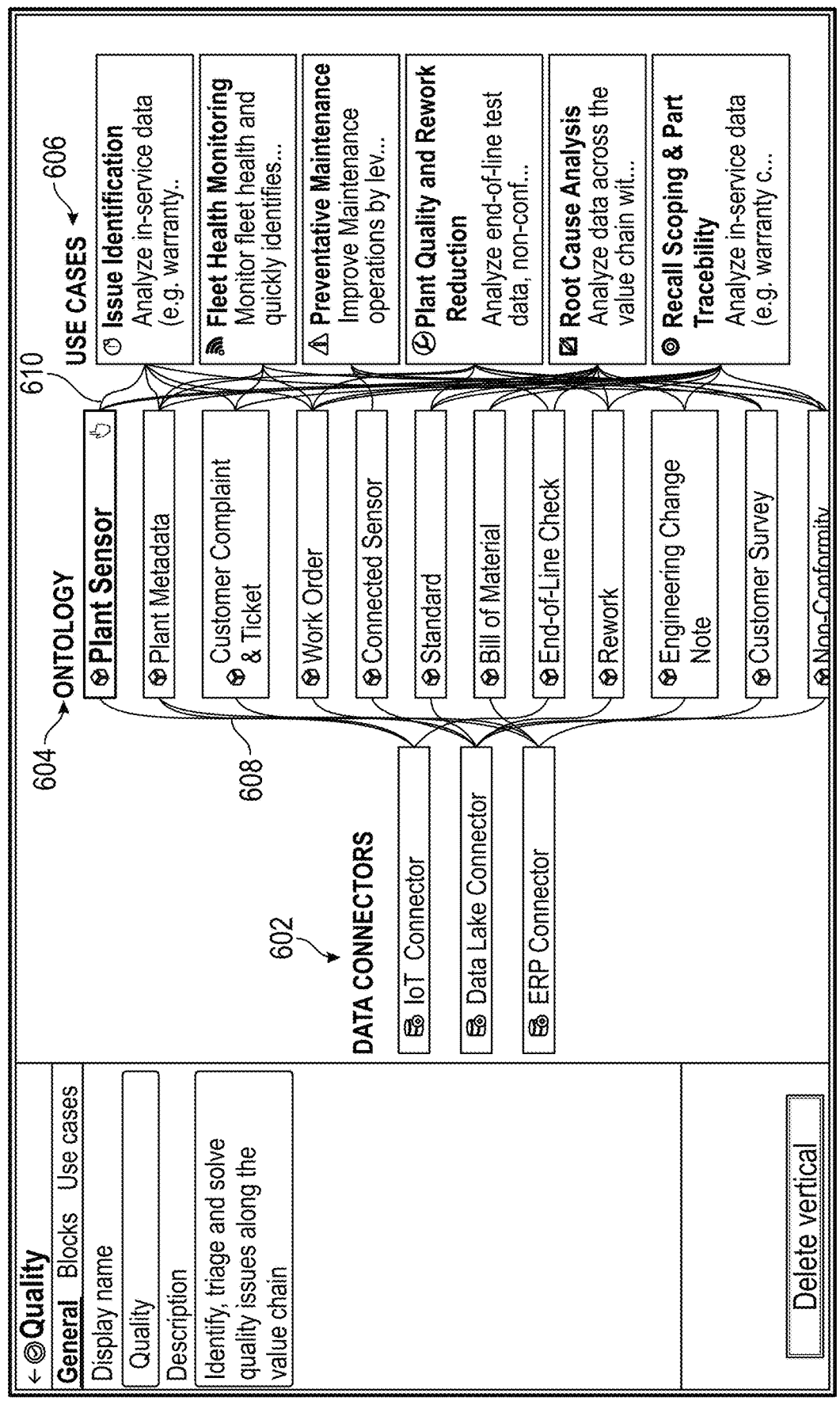
Figure 6B:
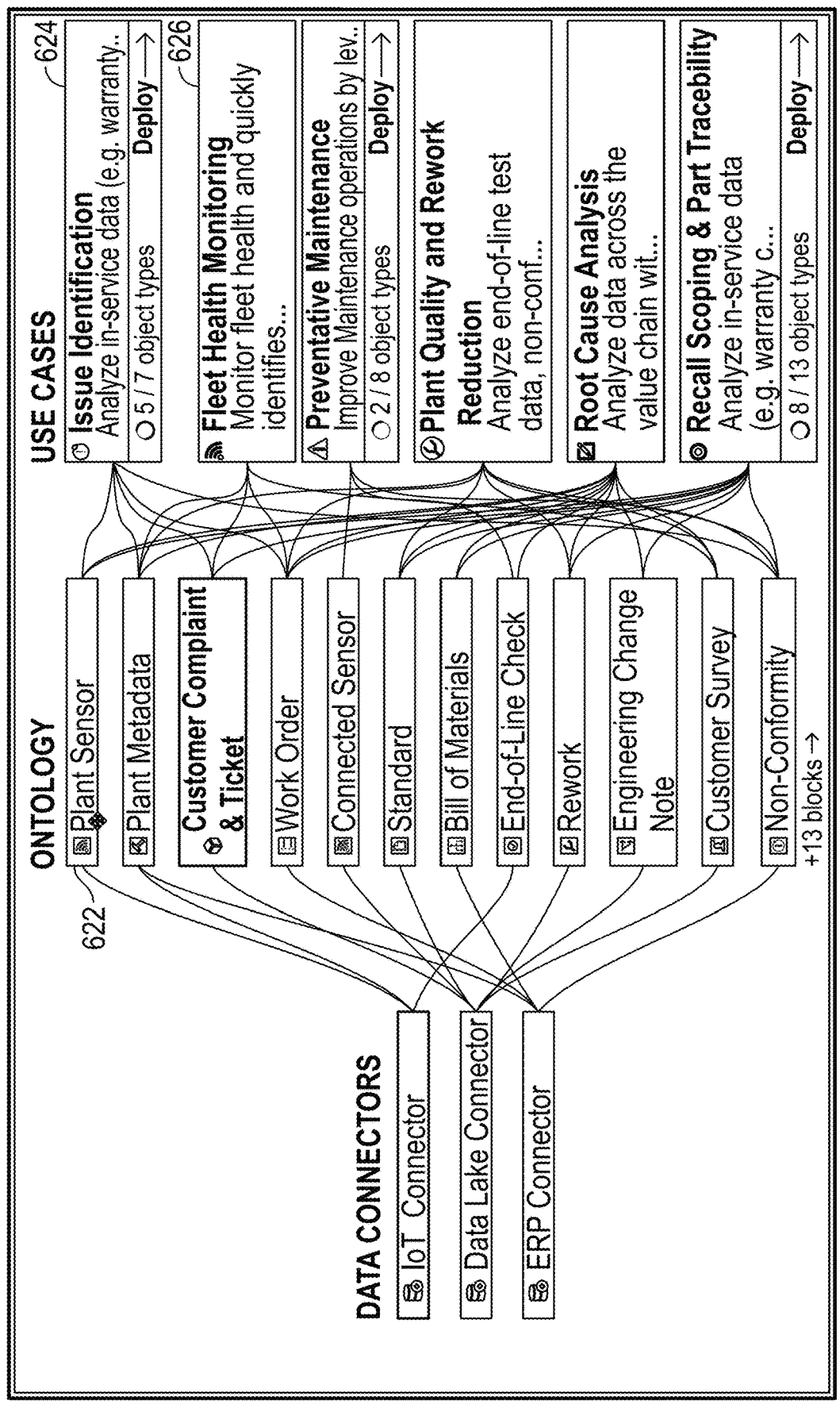
Figure 6C:
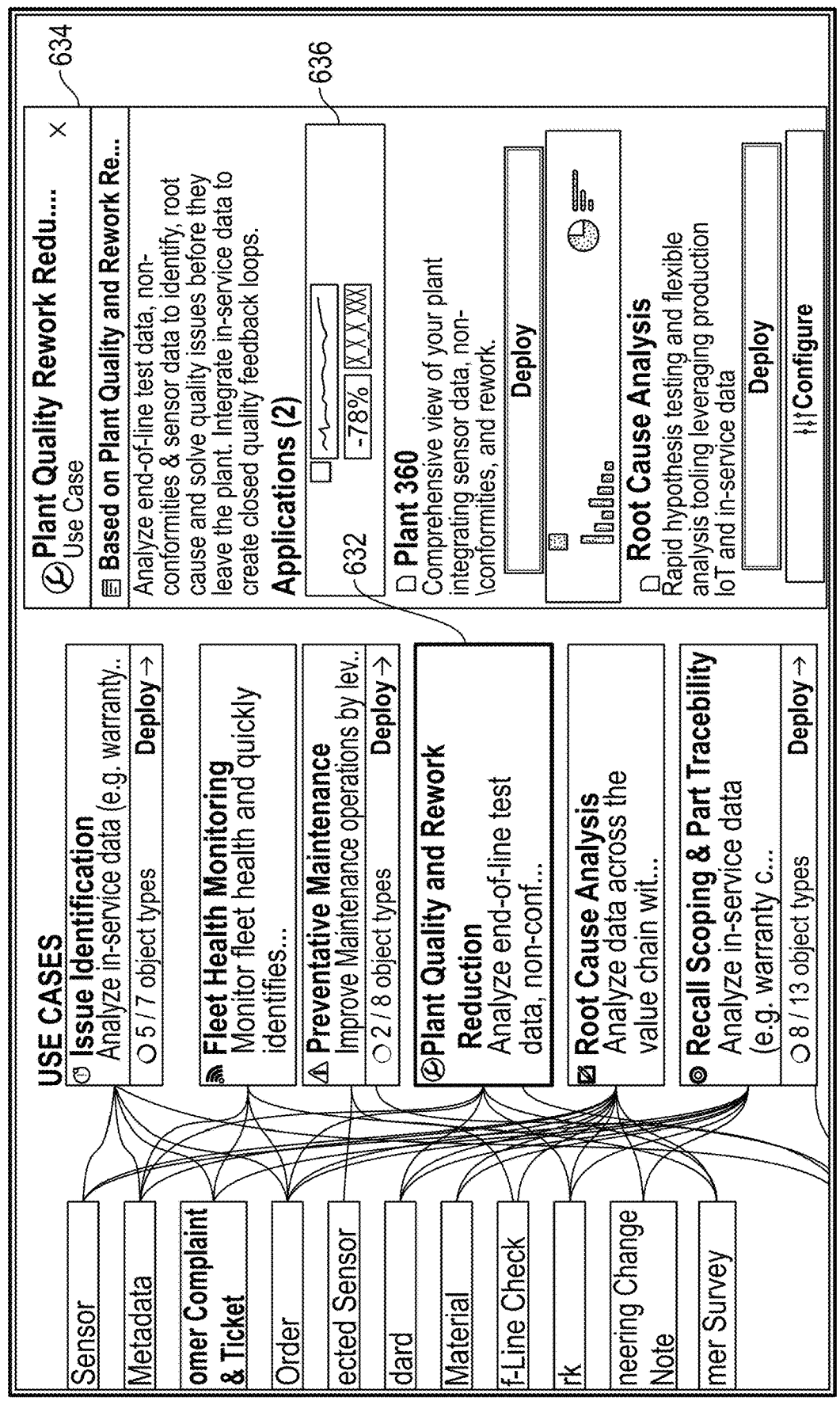

FIGS. 6A-6C illustrate example interactive graphical user interfaces associated with such configurations. Referring to FIG. 6A, an example user interface is shown which visually represents various items as nodes, and connections or relationships among those nodes as edges connecting the nodes.

The example user interface includes the following: use cases 606 on the far right, data object types 604 (e.g., from the ontology) in the middle, and "data connectors" or data sources 602 on the left. The data types (in the middle of the user interface) may be determined by the system based on, for example, data APIs and/or configurations associated with the data sources, use cases, and/or applications. For example, applications associated with a particular use case may use certain data object types (which may include particular properties or other attributes of those data object types), and accordingly such data object types may be displayed in the user interface. Edges 608, 610 indicate relationships among the data sources, data object types, and use cases/applications. Those relationships may indicate compatibilities (which may be determined by the system, as described herein) and/or connections/links/associations. The far left sidebar of the example user interface may be used for various configuration tasks. The various indications shown in the example user interface may be selectable by a user to interact with and configure various aspects of the system, including making connections, e.g., between use cases/applications and data object types, and/or between data object types and data sources.

Referring to FIG. 6B, an example user interface is shown which may be an update from the user interface of FIG. 6A. In particular, various of the data object types (e.g., "plant sensor" 622) has changed in color (or otherwise highlighted) to indicate, for example, that that data object type has been connected or associated with a data source. Alternatively, the change of highlighting of the data object types may indicate a connection or association with a use case/application. Another change in the user interface of FIG. 6B is the use case indication which now show information regarding connections or association with various of the data object types. For example, the "issue identification" use case 624 indicates that five of seven object types used by applications of that use case have been configured or connected. The user may optionally select "deploy" to deploy that use case to make the associated applications available for a user to access and use (e.g., make the interactive graphical user interfaces associated with the applications available for use). The "fleet health monitoring" use case 626 is colored (or otherwise highlighted) to indicate that that use case has been deployed. Alternatively, the change of highlighting of the use case indicator may indicate that all related data object types have been configured or connected. As the user hooks up data sources to data types, and activates various use cases and applications, the user interface may be updated accordingly.

Referring to FIG. 6C, an example user interface is shown which may be an update from the user interface of FIG. 6B. In particular, additional information 634 associated with use case 632 may be displayed in a popup, overlay, or sidebar (and/or the like) in response to the user's selection of the use case 632. The additional information 634 may include, for example, description of various applications 636 associated with the user case. Via the additional information 634, the user may select particular applications (e.g., to configure those applications) and/or deploy particular applications.

Figure 7A:
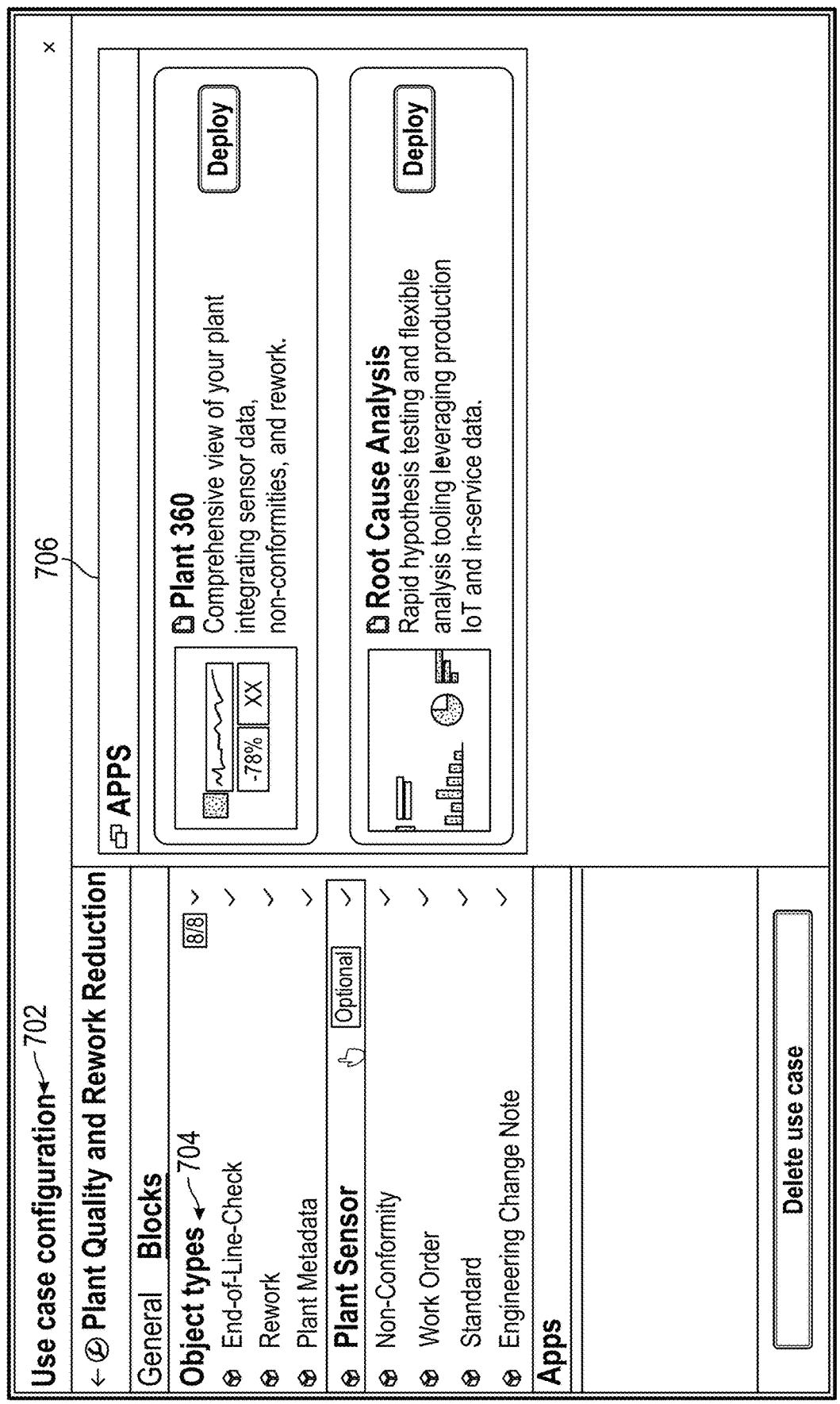

FIGS. 7A-7H illustrate example interactive graphical user interfaces associated with configuring use cases and/or applications. Referring to FIG. 7A, an example user interface 702 is shown which may be displayed, for example, in response to a user selecting to configure a use case and/or application (e.g., by selection of a use case and/or application via one of GUIs shown in FIGS. 6A-6C). The example interactive graphical user interface 702 includes, for example, a listing of data object types 704 associated with the use case and/or one or more applications of the use case. The user interface also includes a listing of applications 706 of the use case. Using the user interface 702, the user can connect or associate data sources with the various data object types (herein shown as "object types") for the applications (as described herein). Advantageously, connecting a data source with a data object type of a use case may connect that data source to all applications of the use case that make use of that data type, enabling rapid configuration of multiple applications through a single interface. Similarly, connecting a data source with a data object type may connect that data source to all use cases (and associated applications) that make use of that data type (e.g., all those use cases that are indicated as compatible with a data object type in the GUIs of FIGS. 7A-7C). In an implementation, the list of object types may be based on data APIs associated with the applications and/or the use case. Compatibilities among data sources, data object types, and use cases/application may be determined as described herein.

Figure 7B:
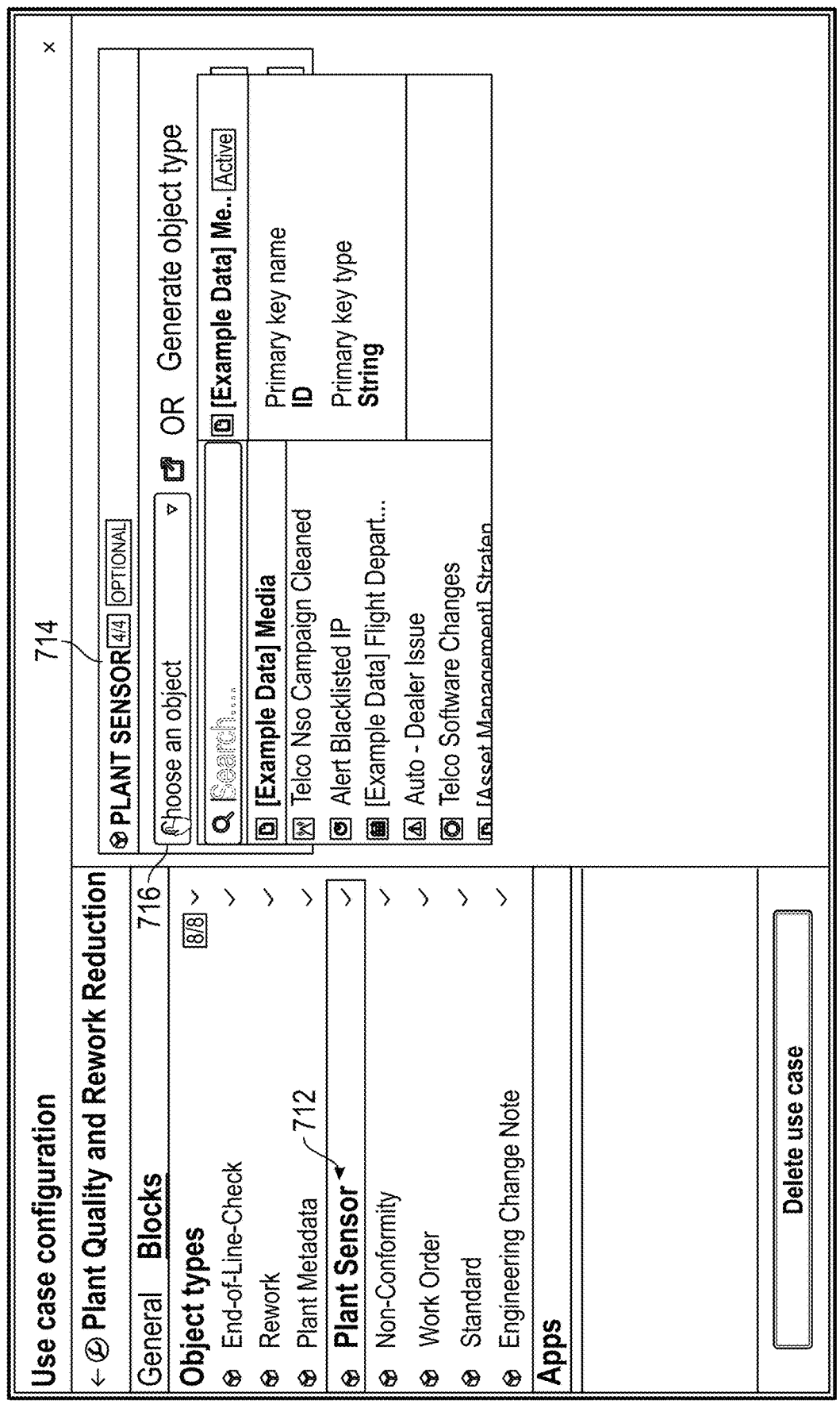

Referring to FIG. 7B, a user may select a particular data object type (e.g., "plant sensor" 712), in response to which the user interface may be updated to display details 714 associated with that data object type. The data object type may comprise a definition of data API associated with one or more applications of the use case, and may include various specifics such as formats, properties, and/or the like. Using interface element 716, the user may search the data sources for a source that matches the selected data object type. The user may use keyword searching to search through the various data source. They system may also automatically determine and recommend particular data sources based on an analysis of matching characteristics of the data object type and the data sources available (and optionally based on related data APIs).

Figure 7C:
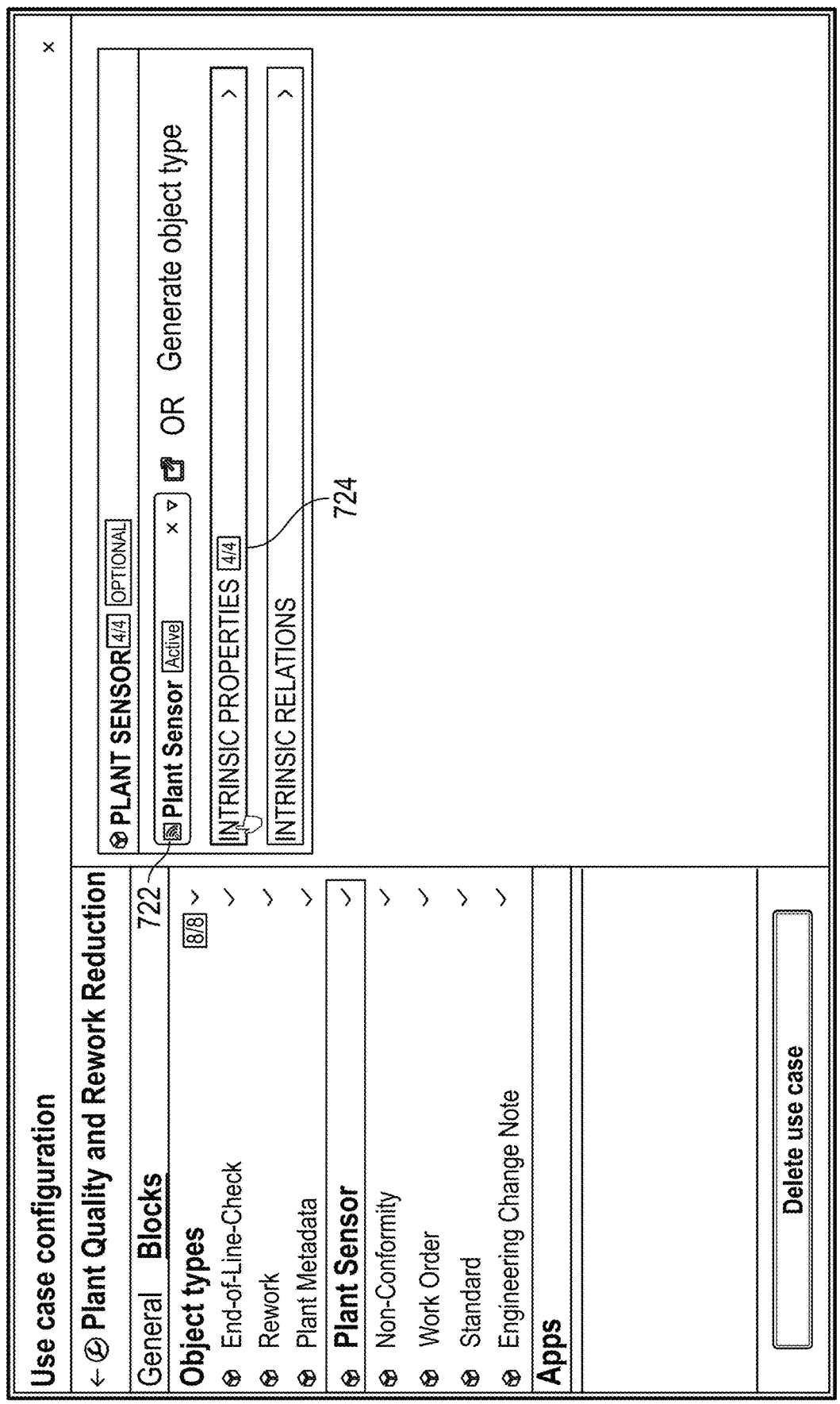
Figure 7D:
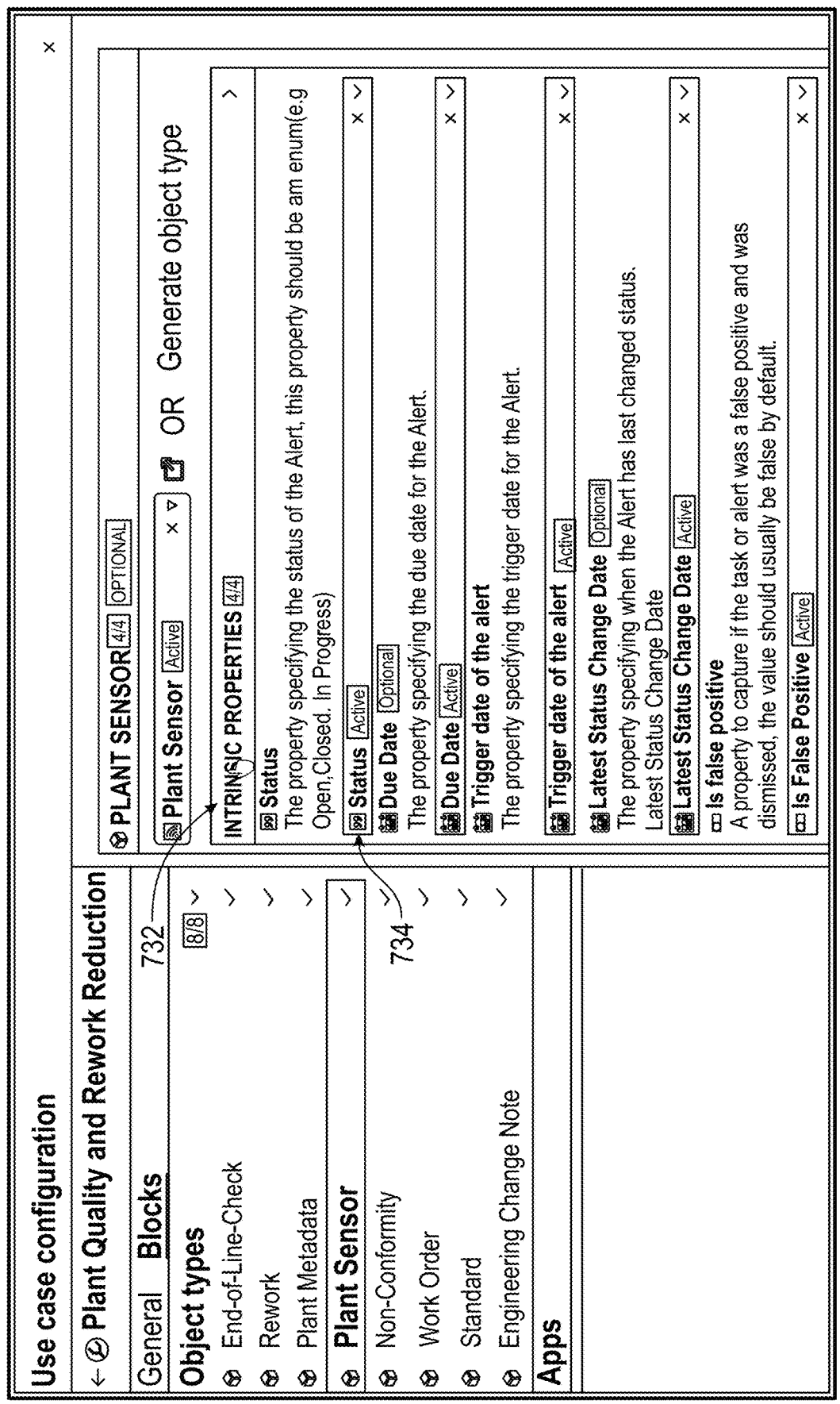

Referring to FIG. 7C, the user has selected a particular data source 722 to connect or associate with the data object type of the use case. The user may also select to view various properties and relations associated with the data object type via user interface elements 724. As shown in FIG. 7D, the user may expand user interface elements 732 and may optionally review and/or modify connections or associations among particular properties 734 of the data object types and data sources. As noted above, advantageously, upon connection of a data source to a data object type of a use case, data objects from the data source may be automatically populated in applications of the use case such that a user may then interact with the applications.

FIG. 7E shows an alternative implementation of an example interactive graphical user interface 742 similar to those of FIGS. 7A-7D described above. The user interface 742 may include various tabs 744 for configuring a selected use case, and may include a listing of various related data object types (e.g., "material" 746) and user interface elements by which a user may connect data sources to the use case (and associated applications). In this user interface, the user can view the auto-generated object types for the specific workflow/applications that the user is deploying. The user can edit the automatically generated object types as needed for the specific deployment the user is targeting. The auto-generated object types can thus tie directly to software defined data integration for the workflow/applications desired.

FIG. 7F shows another tab 748 of the user interface 742 in which a user may configure functions 750 associated with the applications of the use case. Here, the user may select different functions to customize operation of the use case and its associated applications (e.g., change configurable aspects of the product templates to be implemented as applications). The user interface may include automatically defined functions, which the user can edit as needed. In some implementations, the "functions" tab additionally includes automatically defined models (e.g., optimization models), which the user can similarly edit as needed.

FIG. 7G shows another tab 752 of the user interface 742 in which a user may configure actions 754 associated with the applications of the use case. Here, the user may configure rules for different actions to customize operation of the use case and its associated applications (e.g., change configurable aspects of the product templates to be implemented as applications). For example, the user may define particular parameters 756 and rules 758 to alter operation of the application as needed for the use case. In the user interface, the user can configure the specific actions that the user wants the end user to have the option to take in the deployed workflows/applications. In the example shown, the end user can cancel an order, fulfill an order, or partially fulfill an order.

Figure 7H:
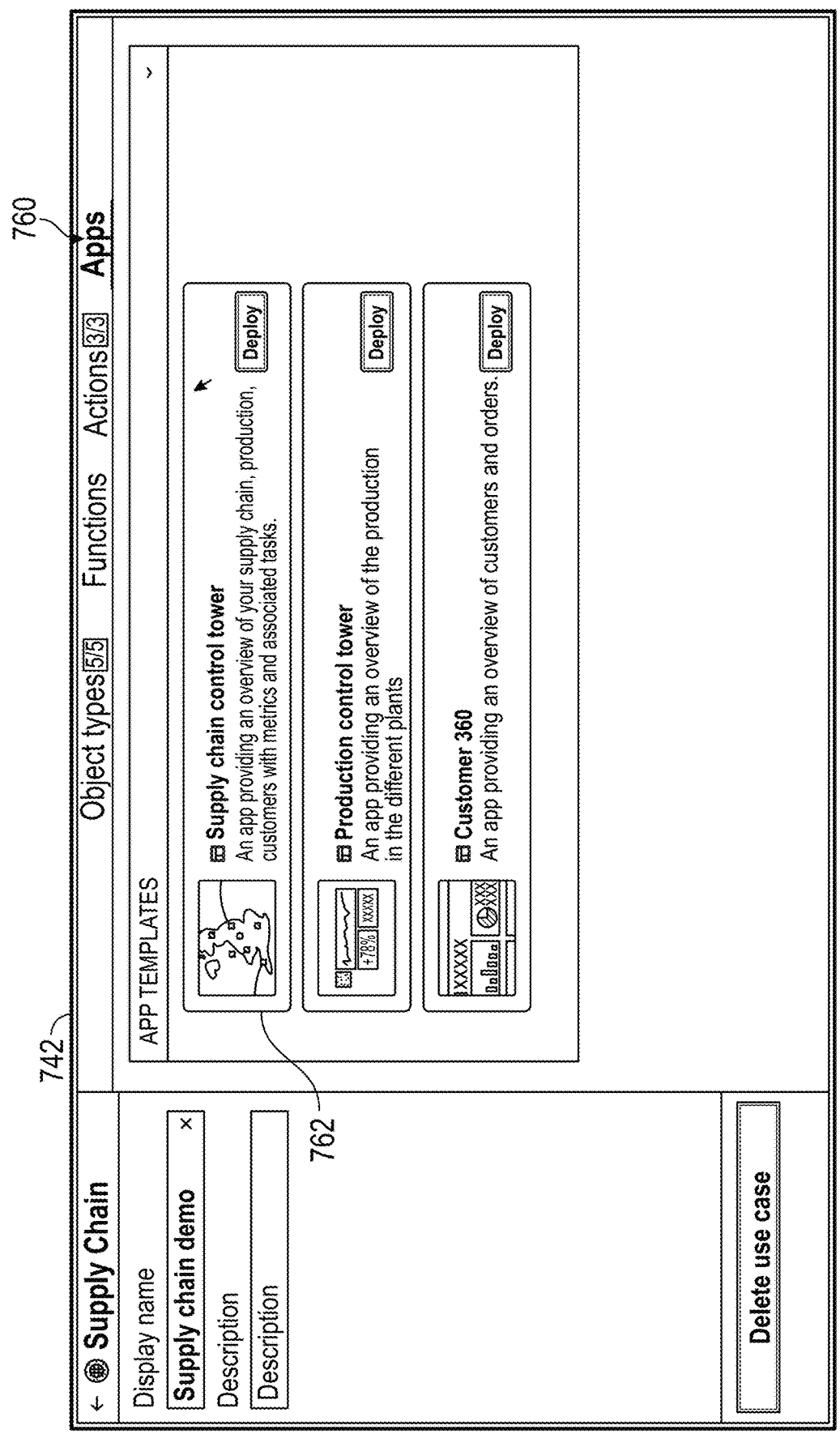

FIG. 7H shows another tab 760 of the user interface 742 in which that various applications 762 associated with the selected use case are listed, and by which the user may select to deploy one or more of the applications (which applications would then be populated with data as defined by the connected data sources and which applications would operate according to the configuration of functions and actions provided by the user). The user can deploy by saving the generated use case workflow/application.

Figure 8:
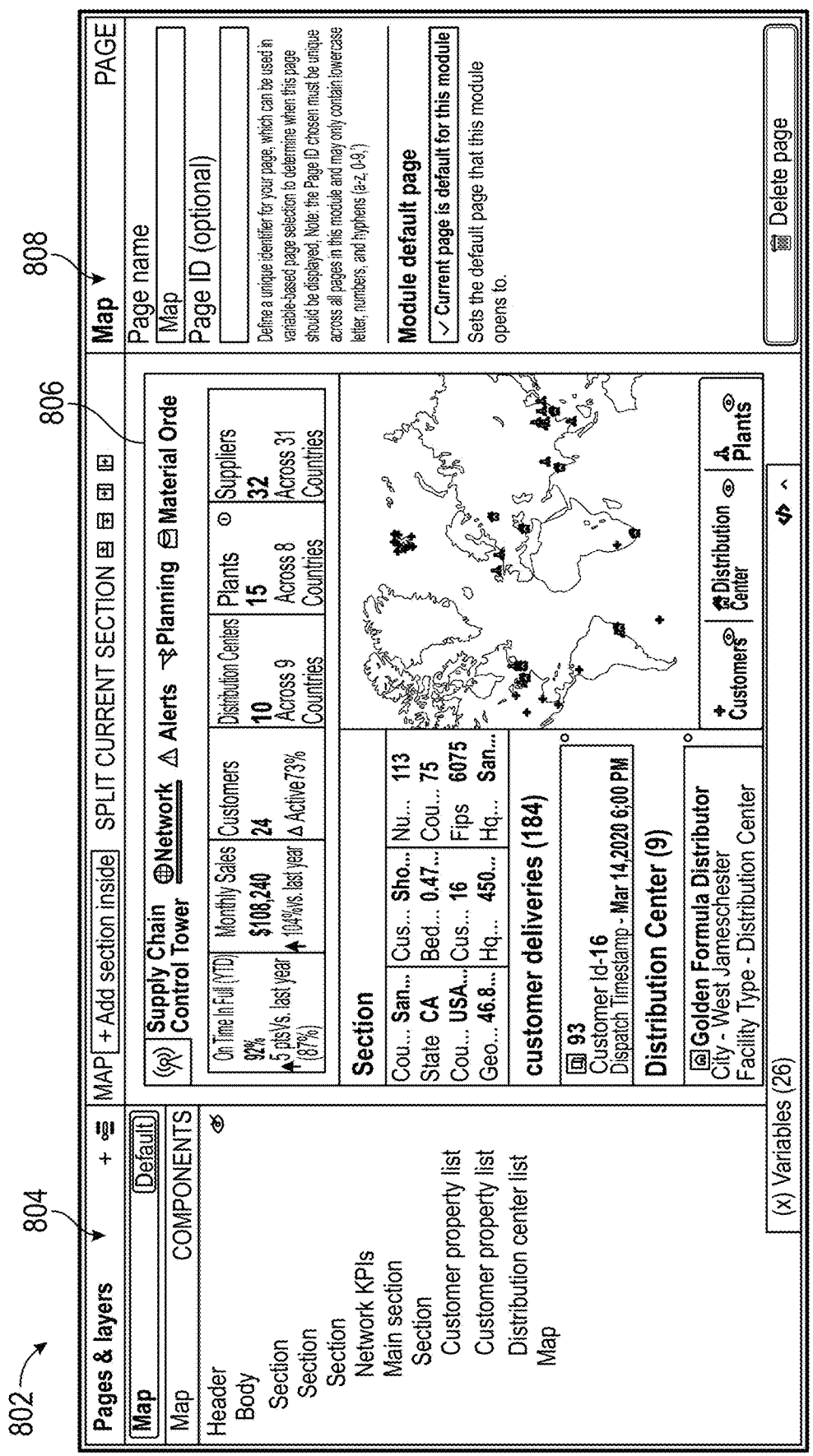

FIG. 8 illustrates an example interactive graphical user interface 802 by which a user may further configure a specific selected application. As shown, the user may access various aspects of the application through side bar 804, may view and modify a preview of a layout of the application via window section 806, and may modify properties of a selected aspect of the application via sidebar 808. Accordingly, in various implementations a user may edit an application (e.g., a template for an application, or a product template) in various ways to customize it, and such an edited template/application may be reused in multiple deployed applications with different data sources connected to it.

Once a data source is connected/identified for a use case or group of use cases (e.g., multiple use cases as listed in the example GUIs of FIGS. 6A-6C), the data source may be useable in all associated use cases/applications. Thus, the other use cases/applications can potentially be deployed without further user identification of data sources, and without configuration of any products or applications.

"Deploying" a use case and/or application can cause the system to make that use case/application available to other users of the system (e.g., as pre-defined and/or based on input from the user initiating the deploying). In various implementations, when "deploying" a use case and/or application, the user may select to effectively "save" a copy of the now configured and hooked up use case and/or application. The use case and/or application can then optionally be further modified and/or shared with other users. Permissioning can also be applied to the deployed use case and/or application such that only users with the right permission can access the use case and/or application, and/or certain data within the use case and/or application.

In various implementations, depending on permissioning associated with users, data, and/or roles, certain users may see certain use cases and/or applications as editable, while other users may see certain use cases and/or applications as viewable.

Advantageously, using the system a user can rapidly and automatedly build and configure use cases and/or applications, and then access those use cases/applications and/or provide access to other user. For example, the user can cause the system to automatically build supply chain control workflow/application, or any other workflow/application, using the use case catalog and system functionality described herein. Thus, in just a few clicks, the user can deploy a framework for generating a complex application/workflow user interface. Advantageously, the system can thus automate significant complexity of generating interactive workflows, enabling accelerated generation of interactive workflows, while still maintaining significant flexibility.

Figure 9B:
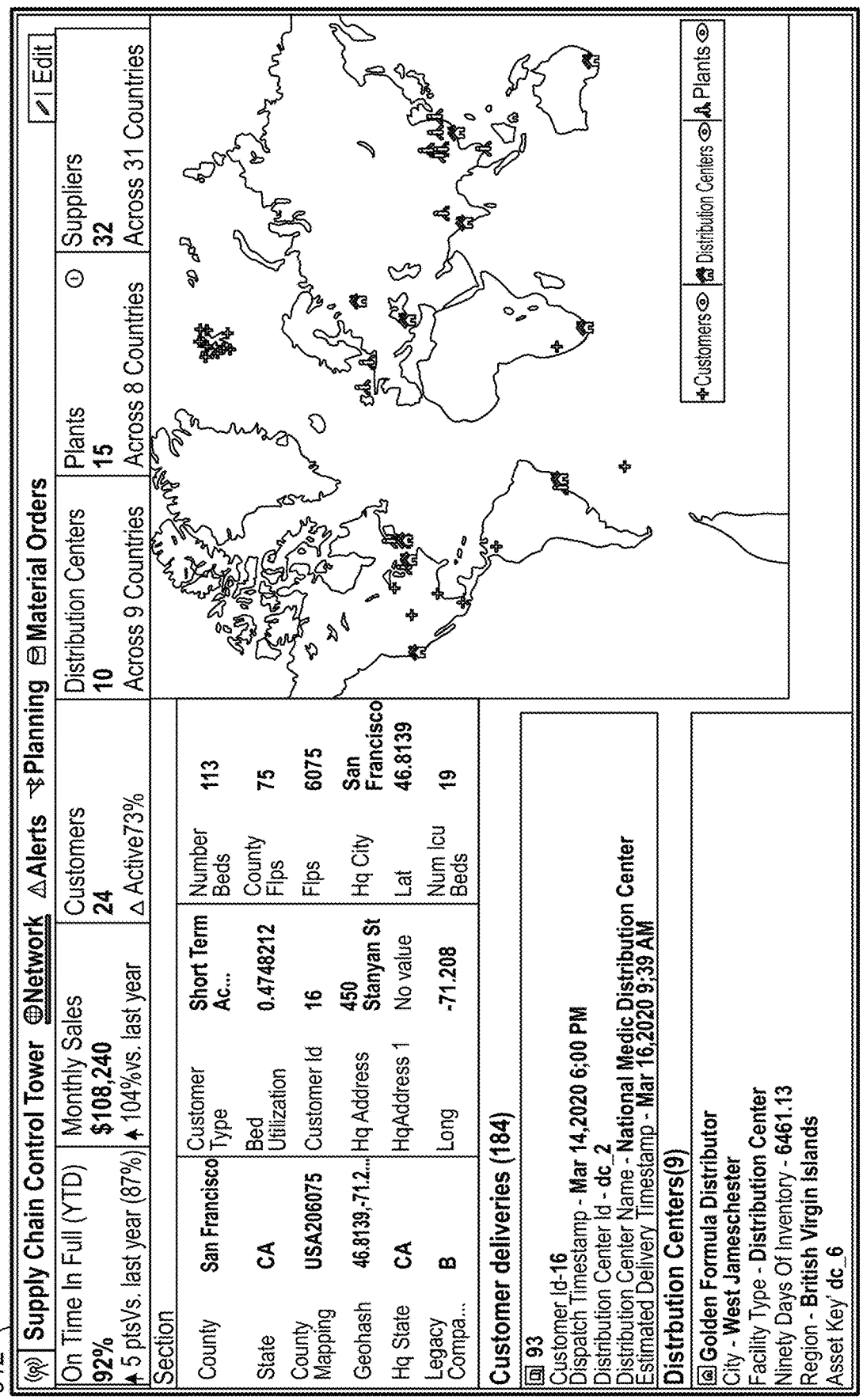

FIG. 9A shows an example interactive graphical user interface 902 that includes a right portion 904 that lists a number of example use cases in a use case catalog (e.g., use cases that are in use, were previously used, have been manually or automatically generated for use, and/or the like). In a left portion of the example user interface 902, deployed use cases 906 are shown (which may be selected by the user to access, review, edit, update, and/or the like). An example deployed application 912 for supply chain management is shown in FIG. 9B. Examples of other applications of the system that may be useful for various use cases are described in U.S. patent application Ser. No. 17/447,105, which is incorporated by reference herein.

Figure 10A:
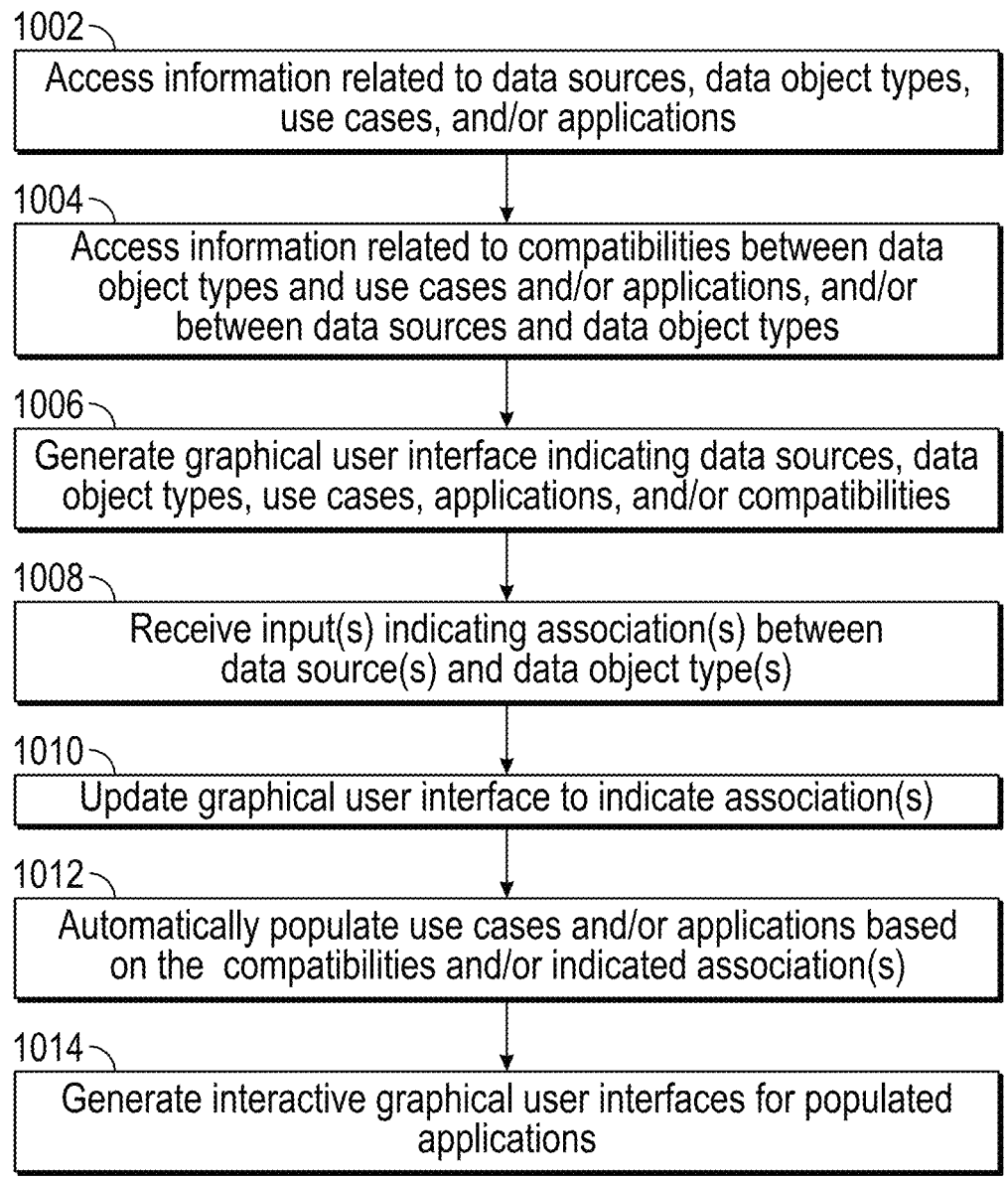
FIGS. 10A-10C show flowcharts illustrating example processes for interacting with and generating various interactive graphical user interfaces, according to one or more embodiments.
Figure 10B:
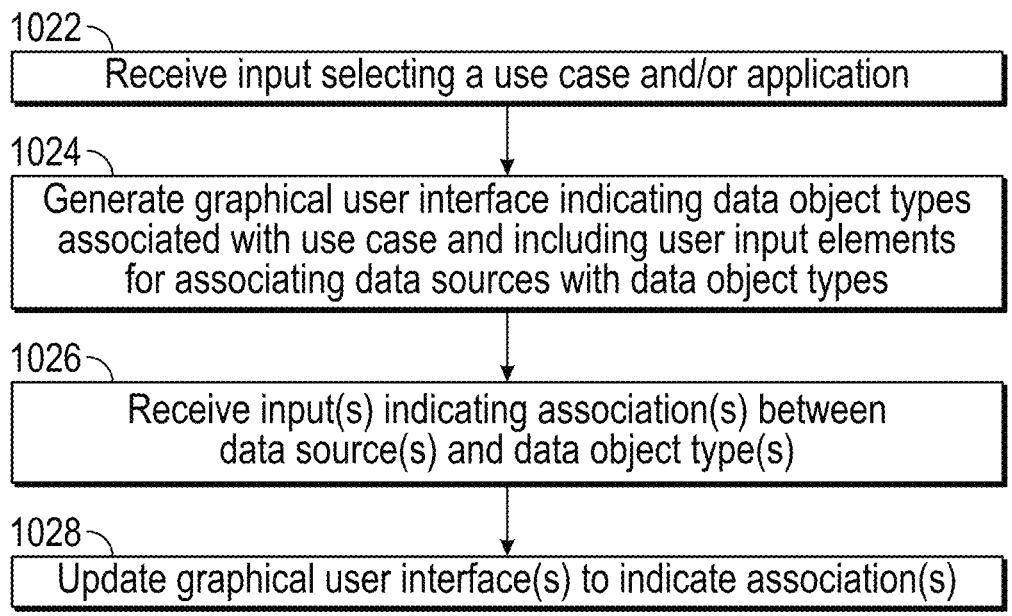
Figure 10C:
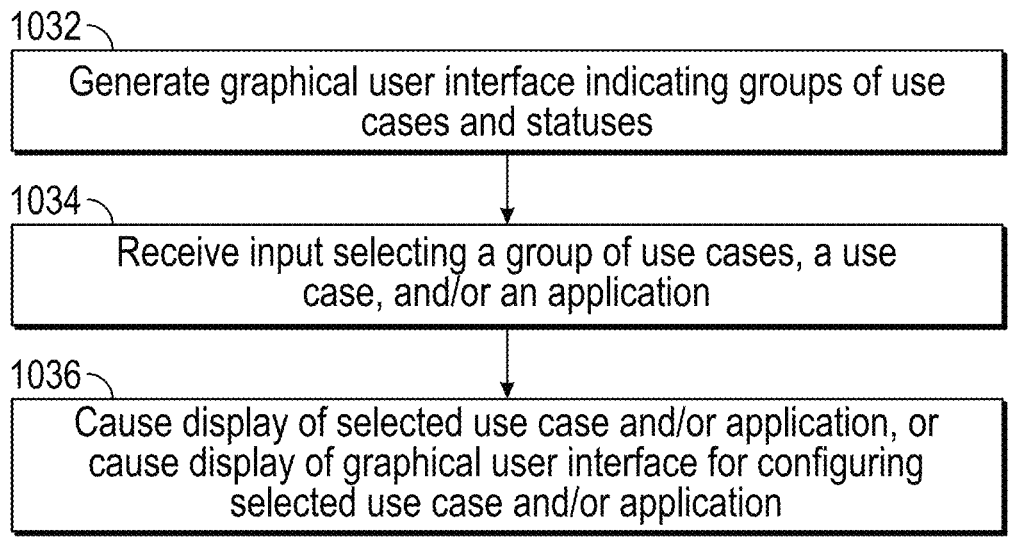

VII. Example Processes for Configuring and Generating Graphical User Interfaces FIGS. 10A-10C show flowcharts illustrating example processes for interacting with and generating various interactive graphical user interfaces, according to one or more embodiments. The blocks of the flowcharts illustrate example implementations, each block may be optional, and in various implementations various blocks may be rearranged, optional, and/or omitted, and/or additional blocks may be added. The example operations of the system illustrated in FIGS. 10A-10C may be implemented, for example, by the system server 104 (e.g., the optimization component 116, the user interface generator 117, the model simulator 118, the subsystem simulator 119, the object simulator 120, data APIs 124, and/or data store 123) of FIG. 1.

Referring to FIG. 10A, at block 1002, the system access information related to data sources, data objects types, use cases, and/or applications. Such information may be accessed from various data stores of the system. At block 1004, the system optionally accesses information related to compatibilities between data object types and use cases and/or applications, and/or between data sources and data object types. Such information may also be accessed from various data stores for the system, and such information may be determined based on data APIs, data object types, and/or other similar information associated with the various applications, use cases, data object types, and/or data sources, as described herein.

At block 1006, the system generates an interactive graphical user interface that includes indications of the data sources, data object types, use cases, applications, and/or compatibilities. Examples of such user interfaces are described herein, and include, for example, the user interfaces of FIGS. 6A-6C and 7A-7H. At block 1008, the system receives one or more user inputs indicating one or more associations between data sources and data object types (and/or from or to various related data APIs of the system). At block 1010, the system can update the user interface(s) to indicate the associations. For example, the user interfaces of FIGS. 6B and 7C illustrate examples of user interfaces that show connections or associations between various data sources and data object types (and/or from or to various related data APIs of the system). At block 1012, the system can automatically populate various use cases and/or applications based on the compatibilities and/or indicated association(s), as described herein. For example, the system can access data from the data sources based on the connections/associations. Such access/population of use cases/applications may be updated periodically or intermittently, based on a configuration of the use cases/applications. Accordingly, at block 1014, the system can generate various interactive graphical user interfaces for the populated use cases/applications (e.g., as shown in FIG. 9B).

Referring to FIG. 10B, at block 1022 the system can receive one or more user inputs selecting a use case and/or application. Such user inputs may be received via various user interfaces of the system, including, for example, various of the example user interfaces of FIGS. 5A-5B, 6A-6C, and 9A, among others. At block 1024, the system can generate a GUI indicating data object types associated with the selected use case (and/or application) and including user input elements for associating data sources with data object types. Examples of such GUIs are described herein in reference to FIGS. 6A-6C and 7A-7E, among others. At block 1026, the system receives one or more user inputs indicating one or more associations between data sources and data object types (and/or from or to various related data APIs of the system). At block 1028, the system can update the user interface(s) to indicate the associations. For example, the user interfaces of FIGS. 6B and 7C illustrate examples of user interfaces that show connections or associations between various data sources and data object types (and/or from or to various related data APIs of the system).

Referring to FIG. 10C, at block 1032 the system can generate an interactive graphical user interface indicating groups of use cases and their associated statuses. Examples of such GUIs are described herein in reference to FIGS. 5A and 9A. At block 1034, the system receives a user input selecting a group of use cases, a use case, and/or an application. At block 1036, the system causes display of the selected use case and/or application, or causes display of graphical user interface for configuring selected use case and/or application. Various GUIs for configuring use cases and applications are described herein in reference to various figures.

VIII. Example Processes and Implementations of Compatibilities and Data APIs As described above, the system may include various data APIs. The data APIs may comprise various input and output data APIs that may define types of data and/or data objects may be provided by, or received by, various data connectors, data pipelines, data sources, applications, use cases, groups of use cases, products, and/or the like. The data APIs may enable determinations of compatibility among, for example, a data source and a group of use cases, a use case, and/or an application, as described herein. Data APIs can also be used to provide suggestions to a user of applications that may be instantiated given the available data sources and various compatibilities.

The data APIs may be based on an ontology that defines various data object types and associated properties and/or links. The data APIs may be included as specifications, configurations, or definitions of the various data sources, use cases, applications, and/or the like. The definitions of the data types and/or data APIs are useful because the application can be configured based on the type of information and its associated properties, so that when actual data of the type defined is received by an instantiation of the application, proper application functionality can be provided. Data types and/or data APIs may be common among multiple applications, and thus, advantageously, and as further explained below, when multiple applications are instantiated by a user (e.g., as part of a use case), providing a data source of a particular data type can provide data of that data type to multiple applications in only a single action by the user. The data APIs may optionally be unique for each of the data sources, groups of use cases, use cases, applications, and/or the like.

Data APIs enable a means for describing the "shape" of data produced ("output" data API) or consumed ("input" data API). Using such information (and/or other methods of data object type information communication, as described herein) the system may determine compatibilities, generate GUIs for connecting data sources and use cases/applications, and provide suggestions, and/or provide hints regarding missing functionality (e.g., "To use the Foo Workshop Application, we recommend that you also install the Bar data connector.").

A data API can be object-oriented (e.g., based on an ontology) API that describes the "shape" of a set of objects in terms of their properties and links. Objects and their properties have names and data types (e.g., string, date, etc.), but can also include semantic properties such as primary-key or non-null. Additionally, as described above, different objects can be linked.

A data API may be based on one or more of an object syntax, a property syntax, column semantics, and/or link semantics. A data API can indicate that certain object, properties, links, and/or the like are optional.

The following is an example object syntax that may be implemented by a data API:
  Human readable object name ("Employee")
  Machine-readable name ("employee")
The following is an example property syntax that may be implemented by a data API:
  Human readable object name ("Date of birth")
  Machine-readable name ("dob" or "date_of_birth")
  Data type: string, integer, double, date_time, enum
  Data constraints:
    Integers: >value, <value, =value
    Strings: matches regex
The following are example column semantics that may be implemented by a data API:
  Unique values
  Primary key
  Non-null
The following are example link semantics that may be implemented by a data API:
  Link human-readable name ("Works at company")
  Link machine-readable name ("works_at")
  Left object (machine-readable)
  Right object (machine-readable)
  Link multiplicity FIG. 12A illustrates example data API definition 1202 as related to data objects. As shown, the example data API defines multiple object types 1204, 1206. For each object type, the data API includes a name and identifier, and various properties 1208. Each of the properties is defined by multiple characteristics 1210, such as a name, identifier, type, and various constraints. The data API can also define object links 1212, with properties such as a name, id, and the data object properties that the link links to. As shown, various aspects of objects or properties can be indicated as optional.

Data APIs can also be defined for tabular data, and may describe the "shape" of a set tables in terms of their columns. Columns can have syntactic properties such as names and data types (e.g., string, date, etc.), but can also include semantic properties such as primary-key or non-null. Additionally, columns in multiple tables can be linked via foreign-key constraints.

A data API may be based on one or more of a table syntax, a column syntax, column semantics, and/or cross-table semantics. A data API can indicate that certain tables, columns, and/or the like are optional.

The following is an example table syntax that may be implemented by a data API:
  Human readable table name ("Employee")
  Machine-readable name ("employee")

The following is an example column syntax that may be implemented by a data API:
  Human-readable name ("Date of birth")
  Machine-readable name ("dob" or "date_of_birth")
  Data type: string, integer, double, date_time, enum
  Data constraints:
    Integers: >value, <value, ==value
    Strings: matches regex The following are example column semantics that may be implemented by a data API:
  Unique values
  Primary key
  Non-null The following are example cross-table semantics that may be implemented by a data API:
  Foreign-key constraint
  Identical columns constraint FIG. 12B illustrates example data API definition 1222 as related to table data. As shown, the example data API defines a table 1224, and multiple columns 1226 in that table. For each column, the data API includes a name and identifier, a type, one or more constraints, and optionally one or more additional properties. As shown, various aspects of tables or properties can be indicated as optional.

In various implementations, the system can define data types along similar lines to those described above in reference to the example data APIs, even if data APIs are not being used. Additionally, while the present disclosure generally refers to data object and data object types, and noted above they similar can similarly operate on tabular data, and use tabular data types analogously.

In an implementation, to satisfy a given output data API, a data sources (e.g., a data connector or data pipeline) satisfies the following:
  it produces at least the objects marked as non-optional
    each such object has at least the specified non-optional properties,
    the property data satisfies the specified constraints
  if it also produces some of the optional objects, then those object have the non-optional properties
  it produces the specified non-optional links
  if it produces some of the optional links, then the links are via the indicated properties Other sets of rules may be applied by the system to determine satisfaction of an output data API, in other implementations. Additionally, similar sets of rules may be applied in the column data context.

In an implementation, to be compatible with a given input data API, an application, use case, or group of use cases (and/or the like) satisfies the following:
  it uses a (not necessarily proper) subset of the specified objects and their specified properties and links, and it uses no other objects
  it functions correctly (but maybe with restricted functionality) if some of the optional objects or properties are not available in the ontology (e.g., if those objects or properties were not linked/connected/configured)

Other sets of rules may be applied by the system to determine compatibility with an input data API, in other implementations. Additionally, similar sets of rules may be applied in the column data context.

Accordingly, as described herein, data APIs may be used to determine compatibilities between various data sources, data object types, applications, use cases, groups of use cases, and the like. As noted above, compatibility may be determined by the system using similar principles and/or sets of rules even when data APIs are not used.

As also noted above, based on determined compatibilities, the system may provide suggestions of, e.g., applications that may be deployed by the user based on available data sources, for example.

In addition to exact input/output data API compatibility (as described above), the system can also determine approximate compatibility. Approximate compatibility can be used by the system, for example, to recommend additional data sources to add to enable particular applications and/or additional functionality in an application, to allow connection of a data source to an application even if the data source does not match the data type exactly, and/or the like. For example, the system can indicate: "If you would like to install this application [with a given, specified input data API], then we recommend you also install this Data Connector and this Data Pipeline." Again, while the description below focuses on data API implementations, the system can provide similar functionality even if data APIs are not used.

In an implementation, the system can determine approximate compatibility based on an aggregative completeness score. For example, approximate compatibility may be based on a number of data object and/or property definitions satisfied (e.g., 7/10 objects fully compatible→70% compatibility; of the remaining 3 objects, on average 20% of properties compatible; overall that gives 76% compatibility).

Alternatively and/or in addition, the system may account for structural similarity when exact matches don't produce meaningful results using, e.g., fuzzy matching, stemming, internationalization and localization ("i18n"), and/or the like. For example, the system may determine that an input data API object "employee" is compatible with an output data API object called "employees", if all of the properties match, with a high confidence (e.g., the system may determine 95% (or some other number) compatibility based on the similarity of the name and the matching properties). In another example, the system may determine a compatibility with a similar level of confidence when the output data API object is called "mitarbeiter" [German word for employee], based on the name being similar (albeit in a different language) and all the properties matching.

In another example, the system may determine that properties are compatible (but perhaps with a lower confidence score) if they have the same name but different types. In another example, the system may determine objects or properties are compatible (but perhaps with a lower confidence score) if some of the constraints are met, but others are not met.

In an implementation, the system may prompt a user to review when a confidence of a match does not satisfy a threshold, and the prompt may include information regarding the reasons for the confidence score. For example: "You are trying to use 'Mitarbeiter' objects as an input to an application that expects 'Employee' objects. The system has determined that the objects are likely compatible, but would require a mapping of the 'Geburtstag' field with pattern 'dd.mm.yyyy' to a 'Date of birth' field with pattern 'yyyy-mm-dd'. Click here to set up the data mapping."

In various implementations, any of the described matching/compatibility techniques described can take user input into account. For example, a user may specify relative importance of certain object types, properties, links, or constraints. The similarity methods can take into account those hints, for instance in the form of weights.

In various implementations, the system can combine multiple data APIs and/or data sources. For example, if two input data APIs produce the same object type, then the resulting object type can be determined by the system to be the intersection of the two data APIs (e.g., such that the resulting data object type has the properties and constraints specified by both data APIs).

The following are additional example implementations or uses of data APIs (and/or data types more generally) in the system:

Given an ontology, the system may suggest applications/use cases (e.g., as from a library or register of applications/use cases) that are compatible with the ontology. The system may find applications/use cases whose data APIs are very similar to the ontology data API.

Given an application/use case a user would like to deploy, the system may suggest data sources that produce data suitable for the application/use case. The system may find data sources with an output data API very similar to the application/use case input data API.

Given a version 1.0.0 of some application/use case, the system can determine whether a newer version 2.0.0 breaks the input or output data API; in other words, the system can determine whether this is a breaking change or a compatible change. For example, the system can determine whether one data API subsumes the other.

Given an input data API and an output data API, the system can automatically generate/propose a mapping that transforms data from the output data API into the input data API. For example, if the output data API specified a "dob" field with syntax "yyyy-mm-dd", and the input data API asks for a "date_of_birth" field with syntax "dd.mm.yyyy", then the system can derive the mapping that renames the property (dob→date_of_birth) and rewrite the date format. Such mapping can be derived from hard-coded rules, heuristics, statistical, machine learning approaches, or any combination of these techniques.

Accordingly, in various implementations, advantageously the system can: determine which data sources, data object types, applications, use cases, and groups of use cases are compatible; can guide users when mapping input/output data; suggest other data sources, data object types, applications, use cases, and groups of use cases to connect and/or deploy (e.g., "Your ontology is also compatible with the following Supply Chain Optimization applications: . . . ").

Figure 11:
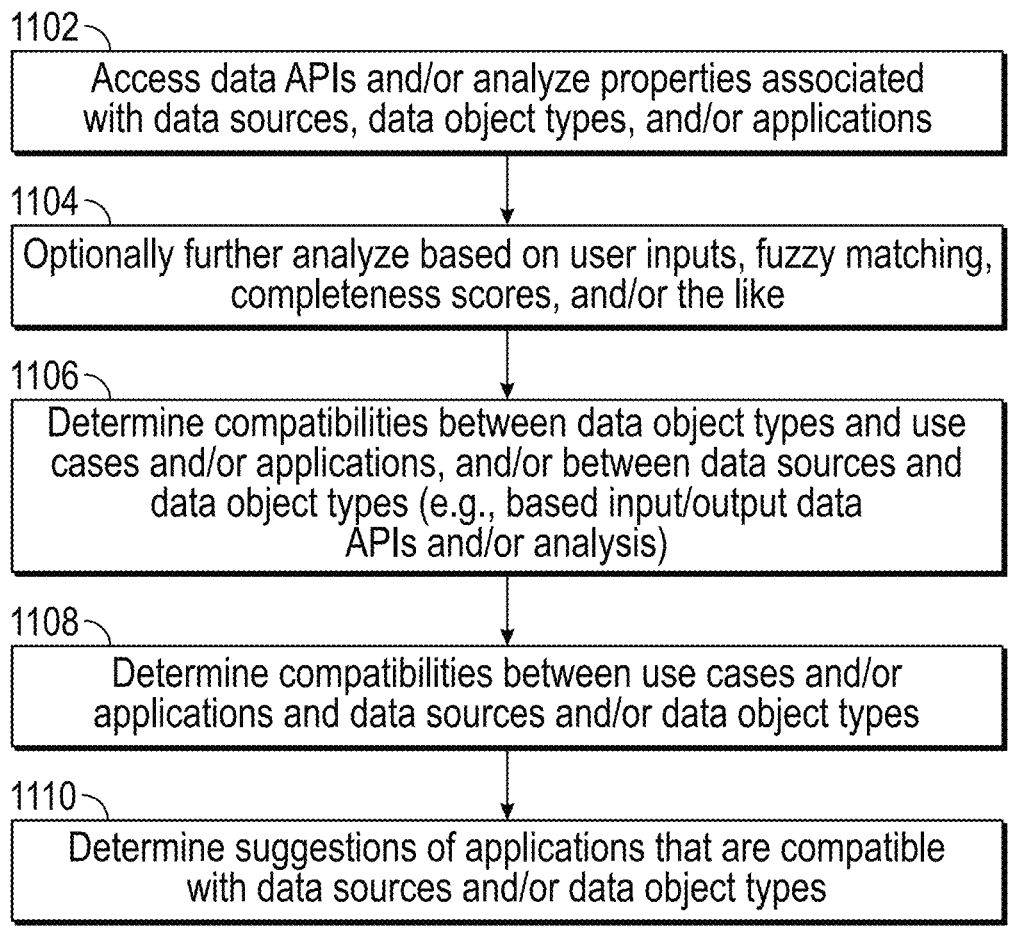
FIG. 11 shows a flowchart illustrating an example process for determining compatibilities, according to one or more embodiments.

FIG. 11 shows a flowchart illustrating an example process for determining compatibilities, according to one or more embodiments. The blocks of the flowchart illustrate example implementations, each block may be optional, and in various implementations various blocks may be rearranged, optional, and/or omitted, and/or additional blocks may be added. The example operations of the system illustrated in FIG. 11 may be implemented, for example, by the system server 104 (e.g., the optimization component 116, the user interface generator 117, the model simulator 118, the subsystem simulator 119, the object simulator 120, data APIs 124, and/or data store 123) of FIG. 1.

At block 1102, the system accesses data APIs and/or analyze properties associated with data sources, data object types, and/or applications. At block 1104, the system optionally further analyzes data APIs and/or properties based on user inputs, fuzzy matching, internationalization and localization, completeness scores, and/or the like. At block 1106, the system can determine compatibilities or approximate compatibilities between data object types and use cases and/or applications, and/or between data sources and data object types (e.g., based input/output data APIs and/or analysis). At block 1108, the system can determine compatibilities or approximate compatibilities between use cases and/or applications and data sources and/or data object types. At block 1110 the system can optionally determine suggestions of applications or use cases that are compatible with data sources and/or data object types, and/or prompt the user regarding compatibilities with lower confidence scores.

Thus, advantageously, the system can, via, e.g., the applications/templates, the data object type definitions, the data APIs, and/or other aspects of the present disclosure (as described herein) provide technical automation for, e.g., determining compatibilities among technical data sources and applications/templates, connecting technical data sources to multiple applications/templates (e.g., associated with a use case or group of use cases), and efficiently generating technical interactive graphical user interfaces for each of the applications/templates, among other features and functionality.

IX. Additional Implementation Details and Embodiments

In an implementation the system (e.g., one or more aspects of the computing environment 100, the system server 104, and/or the like) may comprise, or be implemented in, a "virtual computing environment". As used herein, the term "virtual computing environment" should be construed broadly to include, for example, computer readable program instructions executed by one or more processors (e.g., as described in the example of FIG. 3) to implement one or more aspects of the modules and/or functionality described herein. Further, in this implementation, one or more services/modules/engines/etc. of the system may be understood as comprising one or more rules engines of the virtual computing environment that, in response to inputs received by the virtual computing environment, execute rules and/or other program instructions to modify operation of the virtual computing environment. For example, a request received from the user computing device 108 may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums). Computer readable storage mediums may also be referred to herein as computer readable storage or computer readable storage devices.

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows 11, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface, among other things.

Figure 3:
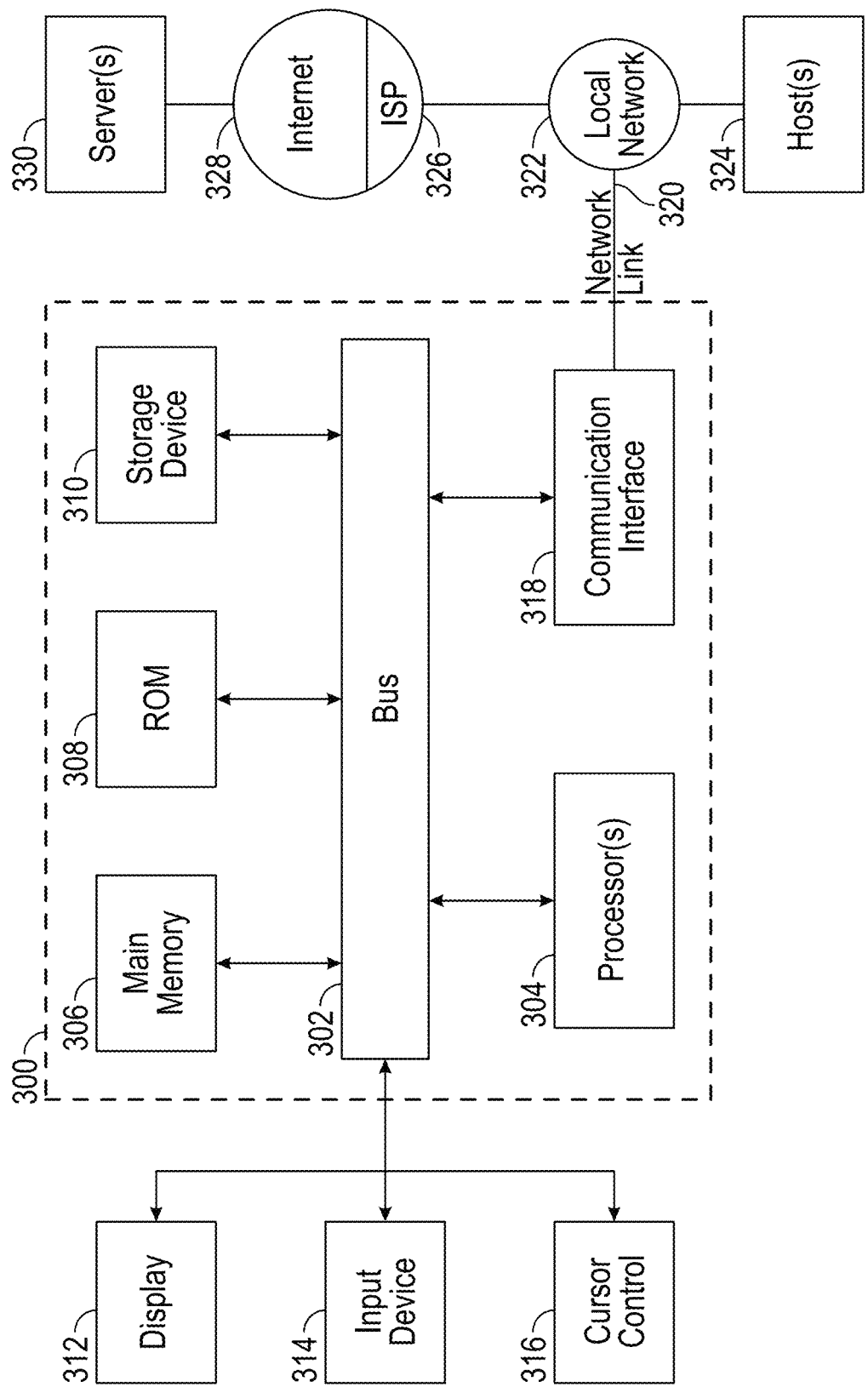
FIG. 3 shows a block diagram illustrating an example computer system upon which various embodiments may be implemented.

For example, FIG. 3 shows a block diagram that illustrates an example computer system 300 upon which various embodiments may be implemented. Computer system 300 includes a bus 302 or other communication mechanism for communicating information, and a hardware processor, or multiple processors, 304 coupled with bus 302 for processing information. Hardware processor(s) 304 may be, for example, one or more general purpose microprocessors.

Computer system 300 also includes a main memory 306, such as a random access memory (RAM), cache and/or other dynamic storage devices, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc., is provided and coupled to bus 302 for storing information and instructions.

Computer system 300 may be coupled via bus 302 to a display 312, such as a cathode ray tube (CRT) or LCD display (or touch screen), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computer system 300 may include a user interface module to implement a GUI that may be stored in a mass storage device as computer executable program instructions that are executed by the computing device(s). Computer system 300 may further, as described below, implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more computer readable program instructions contained in main memory 306. Such instructions may be read into main memory 306 from another storage medium, such as storage device 310. Execution of the sequences of instructions contained in main memory 306 causes processor(s) 304 to perform the process steps described herein. In alternative embodiments, hard-wired circuitry may be used in place of or in combination with software instructions.

Various forms of computer readable storage media may be involved in carrying one or more sequences of one or more computer readable program instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN (or WAN component to communicated with a WAN). Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

In some embodiments, an alert and/or notification is automatically transmitted to the user device operated by the entity associated with the alert and/or notification from the system (e.g., system simulation server and/or physical or logical system). The alert and/or notification can be transmitted at the time that the alert and/or notification is generated or at some determined time after generation of the alert and/or notification. When received by the user device, the alert and/or notification can cause the user device to display the alert and/or notification via the activation of an application on the user device (e.g., a browser, a mobile application, etc.). For example, receipt of the alert and/or notification may automatically activate an application on the user device, such as a messaging application (e.g., SMS or MMS messaging application), a standalone application (e.g., a data analysis application), or a browser, for example, and display information included in the alert and/or notification. If the user device is offline when the alert and/or notification is transmitted, the application may be automatically activated when the user device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the user device (e.g., a mobile device) receives the alert, a browser (or other application) is automatically activated and the URL included in the alert and/or notification is accessed via the Internet.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some embodiments, the technical objects may comprise physical or virtual measuring devices or sensors coupled to physical or virtual technical items or products, pumps, machinery, welding stations, vats, containers, compressors, fans, turbines, blowers, air conditioning systems, heating systems, noise and attenuation systems, ventilation systems, hydraulic systems, pneumatic systems, actuators, fasteners, threads, piping systems, valves, beams, columns, cables, nozzles, semiconductor devices, motors, transformers, electrical components, wires, generators, nuclear reactors, items or products, organizations, countries, counties, factories, customers, hospitals, or other objects relevant to the pertaining model.

In some embodiments, the one or more object properties may be numerical, physical, geometrical, inferred, real, simulated, or virtual. Further the object properties may comprise of logical computations related to order volume, sales amounts, sales quantity during a time period (e.g., a day, a week, a year, etc.), population density, patient volume, or other object properties relevant to the pertaining model. Alternatively or in addition, the technical object properties may comprise of measurements related to temperature, pressure, flow rate, capacity, time, length, mass, electric current, amount of substance, luminous intensity, plane angle, solid angle, frequency, energy, power, charge, voltage, capacitance, resistance, conductance, flux, inductance, radioactivity, dose, catalytic activity, area, volume, speed, acceleration, density, or other object properties relevant to the pertaining model.

In some embodiments, the data resulting from the simulation of multiple models may comprise of historical object data, historical object property data, live object data, live object property data, predicted object data and predicted object property data.

In some embodiments, the given period of time the trend panel displays for one or more object properties of an object may comprise of seconds, minutes, hours, days, weeks, or years.

In some embodiments, the state of a technical object may comprise of open, closed, running above specification, running below specification, in repair, broken, or other like status indicators relevant to the pertaining model.

In some embodiments, the events that occurred in association with an technical object may comprise weather events, maintenance events, or other like events relevant to the pertaining model.

Aspects of the present disclosure are described herein with reference to Application Programming Interfaces. Various third-parties operate electronic services systems which in some instances, these systems may allow access through APIs. Typically, each API requires its own set of information about a data object, such as name, age, and height for a data object representing a person. Advantageously, embodiments of the present disclosure may collect information related to a data object, form API requests in the format and containing the information required by the API of each third-party ("third-party format"), collect responses from the API of each third-party, translate the different results back into a uniform format that facilitates comparison, storage and/or processing ("common format"), and show the results to the user. For example, different third-parties may require different types of information, and in different format; for example, third-party A may require a data object's name and age properties, whereas third-party B may require an a data object's age and height properties but not name.

Advantageously, rather than presenting the user with different third-parties' requests to provide different information repeatedly, the system may retrieve the required information from its database and automatically convert it into the format expected by the third-party. Advantageously, the system may then also convert the individual responses received from each API, which may again be in a third-party-specific format, into a common format that may facilitate comparison by the user. Similarly, various embodiments may use external APIs to access other services.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

X. Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A computer-implemented method comprising, by one or more hardware processors executing program instructions: providing a catalog of use-case templates that may be instantiated as interactive workflow user interfaces; receiving a selection of a first use-case template; and instantiating the first use-case template as an interactive workflow user interface.

Clause 2: The computer-implemented method of Clauses 1, wherein the use-case templates include at least one of: data object types, functions, models, or actions.

Clause 3: The computer-implemented method of any of Clauses 1-2, wherein the use-case templates further include applications.

Clause 4: The computer-implemented method of any of Clauses 1-3, wherein instantiating the first use-case template includes automatically generating object types, functions, models, and/or user actions that may be edited by a user.

Clause 5: The computer-implemented method of any of Clauses 1-4 further comprising, by the one or more hardware processors executing program instructions: receiving, from a user, inputs to modify automatically generated object types, functions, models, and/or user actions associated with the first use-case template.

Clause 6: The computer-implemented method of any of Clauses 1-5 further comprising, by the one or more hardware processors executing program instructions: deploying the first use-case template as an end-user application/interface.

Clause 7: The computer-implemented method of Clause 6 further comprising, by the one or more hardware processors executing program instructions: receiving user inputs modifying aspects of the end-user application/interface.

Clause 8: A system comprising: a computer readable storage medium having program instructions embodied therewith; and one or more processors configured to execute the program instructions to cause the system to perform the computer-implemented method of any of Clauses 1-7.

Clause 9: A computer program product comprising a computer readable storage medium having program instructions embodied therewith, the program instructions executable by one or more processors to cause the one or more processors to perform the computer-implemented method of any of Clauses 1-7.

Clause 10: A computer-implemented method comprising, by one or more hardware processors executing program instructions: providing a catalog of product templates ("applications") that may be instantiated as interactive workflow user interfaces; receiving a selection of a first application; and instantiating the first application as an interactive workflow user interface.

Clause 11: The computer-implemented method of Clause 10, wherein the applications include at least one of: data object types, functions, models, or actions.

Clause 12: The computer-implemented method of any of Clauses 10-11, wherein the applications are grouped into use-cases.

Clause 13: The computer-implemented method of any of Clauses 10-12, wherein instantiating the first application includes automatically generating object types, functions, models, and/or user actions that may be edited by a user.

Clause 14: The computer-implemented method of any of Clauses 10-13 further comprising, by the one or more hardware processors executing program instructions: receiving, from a user, inputs to modify automatically generated object types, functions, models, and/or user actions associated with the first application.

Clause 15: The computer-implemented method of any of Clauses 10-14 further comprising, by the one or more hardware processors executing program instructions: deploying the first application as an end-user application/interface.

Clause 16: The computer-implemented method of Clause 15 further comprising, by the one or more hardware processors executing program instructions: receiving user inputs modifying aspects of the end-user application/interface.

Clause 17: A system comprising: a computer readable storage medium having program instructions embodied therewith; and one or more processors configured to execute the program instructions to cause the system to perform the computer-implemented method of any of Clauses 10-16.

Clause 18: A computer program product comprising a computer readable storage medium having program instructions embodied therewith, the program instructions executable by one or more processors to cause the one or more processors to perform the computer-implemented method of any of Clauses 10-16.

Clause 19: A computer-implemented method comprising, by one or more hardware processors executing program instructions: accessing one or more data stores that store: information indicative of one or more groups of use cases; information indicative of one or more use cases associated with each respective one of the one or more groups of use cases; information indicative of one or more applications associated with each respective one of the one or more use cases; and information indicative of any data object types associated with each respective one of the one or more applications; and generating a first graphical user interface based at least in part on the access of the one or more data stores.

Clause 20: The computer-implemented method of Clause 19, wherein the first graphical user interface includes indications of the one or more groups of use cases and the one or more use cases associated with each respective one of the one or more groups of use cases.

Clause 21: The computer-implemented method of any of Clauses 19-20 further comprising, by the one or more hardware processors executing program instructions: in response to a first user input, generating a second graphical user interface including indications of relationships among a first one or more use cases associated with a first group of use cases, and a first one or more data object types associated with applications associated with the first one or more use cases.

Clause 22: The computer-implemented method of Clause 21 further comprising, by the one or more hardware processors executing program instructions: enabling a user to assign data sources for each of the first one or more data object types.

Clause 23: The computer-implemented method of Clause 22, wherein assigning a data source for a first data object type of the one or more data object types for a first application in the first one or more use cases causes assignment of the data source for the first data object type for all applications in the first one or more use cases.

Clause 24: The computer-implemented method of any of Clauses 19-23 further comprising, by the one or more hardware processors executing program instructions: enabling a user to deploy, save, and/or modify use cases and/or applications.

Clause 25: The computer-implemented method of any of Clauses 19-24, wherein the data object types are defined by an ontology.

Clause 26: A system comprising: a computer readable storage medium having program instructions embodied therewith; and one or more processors configured to execute the program instructions to cause the system to perform the computer-implemented method of any of Clauses 19-25.

Clause 27: A computer program product comprising a computer readable storage medium having program instructions embodied therewith, the program instructions executable by one or more processors to cause the one or more processors to perform the computer-implemented method of any of Clauses 19-25.

Clause 28: A computer-implemented method for automatically generating interactive graphical user interfaces, the computer-implemented method comprising, by one or more hardware processors executing program instructions: accessing one or more data stores that store: information indicative of one or more data sources, information indicative of one or more data object types, information indicative of one or more applications, and information indicative of compatibilities between the one or more data object types and the one or more applications; receiving a first user input indicating an association between a first data source and a first data object type; and based on the compatibilities and the indicated association, automatically populating each of the one or more applications that is compatible with the first data object type with data from the first data source, wherein populating includes generating interactive graphical user interfaces.

Clause 29: The computer-implemented method of Clause 28, wherein the one or more data stores further store: information indicative of one or more use cases, wherein the applications are associated with use cases.

Clause 30: The computer-implemented method of Clause 29 further comprising, by the one or more hardware processors executing program instructions: generating a first interactive graphical user interface based at least in part on access of the one or more data stores, the first interactive graphical user interface including: first graphical indications of the one or more data sources, second graphical indications of the one or more data object types, third graphical indications of the one or more use cases, and fourth graphical indications of the compatibilities between the one or more data object types and the one or more applications, wherein the fourth graphical indications link to use cases with which the respective one or more applications are associated; and in response to receiving the first user input, updating the first interactive graphical user interface to indicate that the first data object type has been associated with the first data source.

Clause 31: The computer-implemented method of Clause 30, wherein: the one or more data stores further store: information indicative of compatibilities between the one or more data sources and the one or more data object types; and the first interactive graphical user interface further includes: fifth graphical indications of the compatibilities between the one or more data sources and the one or more data object types.

Clause 32: The computer-implemented method of any of Clauses 30-31 further comprising, by the one or more hardware processors executing program instructions: in response to a second user input selecting a first use case of the one or more use cases, generating a second interactive graphical user interface including: indications of data object types associated with any applications associated with the first use case, and user input elements configured to receive associations of data sources with the data object types associated with any applications associated with the first use case.

Clause 33: The computer-implemented method of Clause 32 further comprising, by the one or more hardware processors executing program instructions: in response to a third user input, received via at least one of the user input elements of the second interactive graphical user interface, indicating an association between a second data object type and a second data source, updating at least the second interactive graphical user interface to indicate that the second data object type has been associated with the second data source.

Clause 34: The computer-implemented method of any of Clauses 32-33, wherein the second interactive graphical user interface further includes: user input elements configured receive functions or actions associated with one or more applications associated with the first use case.

Clause 35: The computer-implemented method of any of Clauses 28-34, wherein at least some of the one or more applications comprise templates of graphical visualizations based on reusable components of software products.

Clause 36: The computer-implemented method of any of Clauses 29-35 further comprising, by the one or more hardware processors executing program instructions: generating a third interactive graphical user interface including: indications of one or more groups of the one or more use cases, indications of use cases in each of the one or more groups, and indications of statuses of each of the one or more use cases.

Clause 37: The computer-implemented method of Clause 36, wherein the indications of statuses include indications of numbers of data object types associated with the respective use cases that have been associated with data sources.

Clause 38: The computer-implemented method of any of Clauses 36-37, wherein the indications of statuses include indications of deployment statuses of the respective use cases or respective groups.

Clause 39: The computer-implemented method of any of Clauses 36-38 further comprising, by the one or more hardware processors executing program instructions: in response to a fourth user input, received via the third interactive graphical user interface, selecting a second use case, at least one of: cause display of an application associated with the selected use case, or cause display of a graphical user interface to configure an application associated with the selected use case.

Clause 40: The computer-implemented method of any of Clauses 31-39 further comprising, by the one or more hardware processors executing program instructions, at least one of: determining the compatibilities between the one or more data object types and the one or more applications; or determining the compatibilities between the one or more data sources and the one or more data object types.

Clause 41: The computer-implemented method of Clause 40, wherein the compatibilities are determined based at least in part on data application programming interfaces ("APIs") associated with the one or more data sources, the one or more data object types, and/or the one or more applications.

Clause 42: The computer-implemented method of Clause 40, wherein the compatibilities are determined based at least in part on properties associated with the one or more data object types as defined by an ontology.

Clause 43: The computer-implemented method of Clause 42, wherein the compatibilities are determined further based on at least one of: user inputs, fuzzy matching, stemming, internationalization and localization, or completeness scores.

Clause 44: The computer-implemented method of any of Clauses 40-43 further comprising, by the one or more hardware processors executing program instructions, at least one of: based at least in part on the determined compatibilities, determine a compatibility of the first application with the one or more data sources and/or the one or more data object types.

Clause 45: The computer-implemented method of any of Clauses 40-44 further comprising, by the one or more hardware processors executing program instructions, at least one of: based at least in part on the determined compatibilities, determine suggestions for applications of the one or more applications that are compatible with the one or more data sources and/or the one or more data object types.

Clause 46: A system comprising: a computer readable storage medium having program instructions embodied therewith; and one or more processors configured to execute the program instructions to cause the system to perform the computer implemented method of any of Clauses 28-45.

Clause 47: A computer program product comprising a computer readable storage medium having program instructions embodied therewith, the program instructions executable by one or more processors to cause the one or more processors to perform the computer implemented method of any of Clauses 28-45.

What is claimed is:

1. A computer-implemented method for automatically generating interactive graphical user interfaces, the computer-implemented method comprising, by one or more hardware processors executing program instructions:
   accessing one or more data stores that store:
      information indicative of one or more data sources,
      information indicative of one or more data object types,
      information indicative of one or more use cases, wherein the one or more use cases include at least one of: supply chain management, predictive maintenance, predictive customer care, plant operation monitoring, aftersales parts alerts and allocation, inspection planning, maintenance planning, asset or plant overview, fleet monitoring, issue identification, root cause analysis, recall scoping and part traceability, or sales lead generation,
      information indicative of one or more applications, wherein the one or more applications are associated with the one or more use cases, and
      information indicative of compatibilities between the one or more data object types and the one or more applications;
   receiving a first user input indicating an association between a first data source and a first data object type;
   determining, using the information indicative of the compatibilities and the first data object type, that a first one or more applications are compatible with the first data object type; and
   based on the compatibilities and the indicated association, automatically populating each of the first one or more applications that is compatible with the first data object type with data from the first data source, wherein populating includes generating interactive graphical user interfaces.

2. The computer-implemented method of claim 1 further comprising, by the one or more hardware processors executing program instructions:
   generating a first interactive graphical user interface based at least in part on access of the one or more data stores, the first interactive graphical user interface including:
      first graphical indications of the one or more data sources, second graphical indications of the one or more data object types, third graphical indications of the one or more use cases, and fourth graphical indications of the compatibilities between the one or more data object types and the one or more applications, wherein the fourth graphical indications link to use cases with which the respective one or more applications are associated; and in response to receiving the first user input, updating the first interactive graphical user interface to indicate that the first data object type has been associated with the first data source.

3. The computer-implemented method of claim 2, wherein:

the one or more data stores further store:

information indicative of compatibilities between the one or more data sources and the one or more data object types; and the first interactive graphical user interface further includes:

fifth graphical indications of the compatibilities between the one or more data sources and the one or more data object types.

4. The computer-implemented method of claim 2 further comprising, by the one or more hardware processors executing program instructions:

in response to a second user input selecting a first use case of the one or more use cases, generating a second interactive graphical user interface including:

indications of data object types associated with any applications associated with the first use case, and user input elements configured to receive associations of data sources with the data object types associated with any applications associated with the first use case.

5. The computer-implemented method of claim 4 further comprising, by the one or more hardware processors executing program instructions:

in response to a third user input, received via at least one of the user input elements of the second interactive graphical user interface, indicating an association between a second data object type and a second data source, updating at least the second interactive graphical user interface to indicate that the second data object type has been associated with the second data source.

6. The computer-implemented method of claim 4, wherein the second interactive graphical user interface further includes:

user input elements configured receive functions or actions associated with one or more applications associated with the first use case.

7. The computer-implemented method of claim 1, wherein at least some of the one or more applications comprise templates of graphical visualizations based on reusable components of software products.

8. The computer-implemented method of claim 1 further comprising, by the one or more hardware processors executing program instructions:

generating a third interactive graphical user interface including:

indications of one or more groups of the one or more use cases, indications of use cases in each of the one or more groups, and indications of statuses of each of the one or more use cases.

9. The computer-implemented method of claim 8, wherein the indications of statuses include indications of numbers of data object types associated with the respective use cases that have been associated with data sources.

10. The computer-implemented method of claim 9, wherein the indications of statuses include indications of deployment statuses of the respective use cases or respective groups.

11. The computer-implemented method of claim 10 further comprising, by the one or more hardware processors executing program instructions:

in response to a fourth user input, received via the third interactive graphical user interface, selecting a second use case, at least one of:

cause display of an application associated with the selected use case, or cause display of a graphical user interface to configure an application associated with the selected use case.

12. The computer-implemented method of claim 11 further comprising, by the one or more hardware processors executing program instructions, at least one of:

determining the compatibilities between the one or more data object types and the one or more applications; or determining the compatibilities between the one or more data sources and the one or more data object types.

13. The computer-implemented method of claim 12, wherein the compatibilities are determined based at least in part on data application programming interfaces ("APIs") associated with the one or more data sources, the one or more data object types, and/or the one or more applications.

14. The computer-implemented method of claim 12, wherein the compatibilities are determined based at least in part on properties associated with the one or more data object types as defined by an ontology.

15. The computer-implemented method of claim 14, wherein the compatibilities are determined further based on at least one of: user inputs, fuzzy matching, stemming, internationalization and localization, or completeness scores.

16. The computer-implemented method of claim 15 further comprising, by the one or more hardware processors executing program instructions, at least one of:

based at least in part on the determined compatibilities, determine a compatibility of a first application with the one or more data sources and/or the one or more data object types.

17. The computer-implemented method of claim 12 further comprising, by the one or more hardware processors executing program instructions, at least one of:

based at least in part on the determined compatibilities, determine suggestions for applications of the one or more applications that are compatible with the one or more data sources and/or the one or more data object types.

18. A system comprising: a computer-readable storage medium having program instructions embodied therewith; and one or more processors configured to execute the program instructions to cause the system to perform the computer-implemented method of claim 1.

19. A computer program product comprising a computer-readable storage medium having program instructions embodied therewith, the program instructions executable by one or more processors to cause the one or more processors to perform the computer-implemented method of claim 1.

* * * * *